US010313079B2

(12) United States Patent
Yerramalli et al.

(10) Patent No.: US 10,313,079 B2
(45) Date of Patent: Jun. 4, 2019

(54) COMMON HARQ PROCESSES

(71) Applicant: QUALCOMM Incorporated, San Diego, CA (US)

(72) Inventors: Srinivas Yerramalli, San Diego, CA (US); Tao Luo, San Diego, CA (US); Durga Prasad Malladi, San Diego, CA (US); Naga Bhushan, San Diego, CA (US); Wanshi Chen, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/465,012

(22) Filed: Aug. 21, 2014

(65) Prior Publication Data

US 2015/0055589 A1   Feb. 26, 2015

Related U.S. Application Data

(60) Provisional application No. 61/869,432, filed on Aug. 23, 2013.

(51) Int. Cl.
*H04L 5/00* (2006.01)
*H04L 1/16* (2006.01)
*H04L 1/18* (2006.01)

(52) U.S. Cl.
CPC .......... *H04L 5/0053* (2013.01); *H04L 1/1822* (2013.01); *H04L 1/1861* (2013.01);
(Continued)

(58) Field of Classification Search
None
See application file for complete search history.

(56) References Cited

U.S. PATENT DOCUMENTS

| 8,514,721 B2 | 8/2013 | Luo et al. |
| 9,553,697 B2 | 1/2017 | Chen et al. |

(Continued)

FOREIGN PATENT DOCUMENTS

| CN | 1917416 A | 2/2007 |
| TW | 201233095 A | 8/2012 |

(Continued)

OTHER PUBLICATIONS

International Search Report and Written Opinion—PCT/US2014/052250—ISA/EPO—dated Feb. 24, 2015.

(Continued)

*Primary Examiner* — Kevin C. Harper
*Assistant Examiner* — Derrick V Rose
(74) *Attorney, Agent, or Firm* — Liem T. Do

(57) ABSTRACT

A sharing of common hybrid automatic repeat request (HARQ) process space by multiple unlicensed spectrum component carriers is described. Because communication access is not guaranteed over the unlicensed spectrum, a set of component carriers in the unlicensed spectrum is assigned to share a common HARQ process space, such that uplink or downlink data will be transmitted over any one or more of the set of component carriers that clear a clear channel assessment (CCA) check. The receiver then provides a HARQ process response over the same HARQ process space using the grouped component carriers that share that common HARQ process space. Thus, any one or more of the set of component carriers sharing the common HARQ process space may both carry the transmitted data and carry the HARQ process response to the attempted data transmission.

88 Claims, 9 Drawing Sheets

(52) U.S. Cl.
  CPC .......... *H04L 1/1887* (2013.01); *H04L 1/1893* (2013.01); *H04L 1/1896* (2013.01); *H04L 5/001* (2013.01); *H04L 1/1671* (2013.01); *H04L 1/1812* (2013.01); *H04L 5/0055* (2013.01)

(56) References Cited

U.S. PATENT DOCUMENTS

| | | | |
|---|---|---|---|
| 2004/0142696 A1* | 7/2004 | Saunders | H04B 1/715 455/450 |
| 2006/0171353 A1* | 8/2006 | Nagata | H04B 7/04 370/329 |
| 2009/0175243 A1* | 7/2009 | Han | H04B 7/12 370/335 |
| 2011/0032890 A1* | 2/2011 | Wu | H04L 5/001 370/329 |
| 2011/0128895 A1 | 6/2011 | Sadek et al. | |
| 2011/0249601 A1 | 10/2011 | Seo et al. | |
| 2012/0307744 A1 | 12/2012 | Charbit et al. | |
| 2012/0314637 A1* | 12/2012 | Kim | H04L 1/1851 370/311 |
| 2013/0165134 A1 | 6/2013 | Touag et al. | |
| 2013/0195073 A1* | 8/2013 | Chen | H04L 5/0023 370/331 |
| 2013/0208710 A1 | 8/2013 | Seo et al. | |
| 2013/0322358 A1* | 12/2013 | He | H04W 72/0406 370/329 |
| 2015/0163805 A1* | 6/2015 | Cattoni | H04W 72/0453 370/329 |
| 2015/0215097 A1* | 7/2015 | Yi | H04W 52/48 370/329 |

FOREIGN PATENT DOCUMENTS

| | | |
|---|---|---|
| WO | WO-2010151550 A1 | 12/2010 |
| WO | WO-2011127100 A1 | 10/2011 |
| WO | WO-2012078565 A1 | 6/2012 |
| WO | WO-2012109195 A2 | 8/2012 |
| WO | WO-2013049136 A1 | 4/2013 |
| WO | WO-2013075314 A1 | 5/2013 |
| WO | WO-2013096563 A1 | 6/2013 |

OTHER PUBLICATIONS

Nokia et al., "L1 control signaling with carrier aggregation in LTE-Advanced", 3GPP Draft; R1-083730, 3rd Generation Partnership Project (3GPP), Mobile Competence Centre; 650, Route Des Lucioles; F-06921 Sophia-Antipolis Cedex; France, no. Prague, Czech Republic; Sep. 24, 2008, Sep. 24, 2008 (Sep. 24, 2008), 7 pages, XP050317069, [retrieved on Sep. 24, 2008].

Partial International Search Report—PCT/US2014/052250—ISA/EPO—dated Dec. 23, 2014.

Reconfigurable Radio Systems (RRS); Use cases for Operation in White Space Frequency Bands, ETSI Draft; 01004V009, European Telecommunications Standards Institute (ETSI), 650, Route Des Lucioles; F-06921 Sophia-Antipolis; France, No. V0.0.9, Jan. 31, 2011, (Jan. 31, 2011), pp. 1-54, XP014063036, [Retrieved on Jan. 31, 2011], sections 5.3.3.3, 5.6.3.4, 5.6.3.5.

Taiwan Search Report—TW103129015—TIPO—dated Apr. 26, 2018.

\* cited by examiner

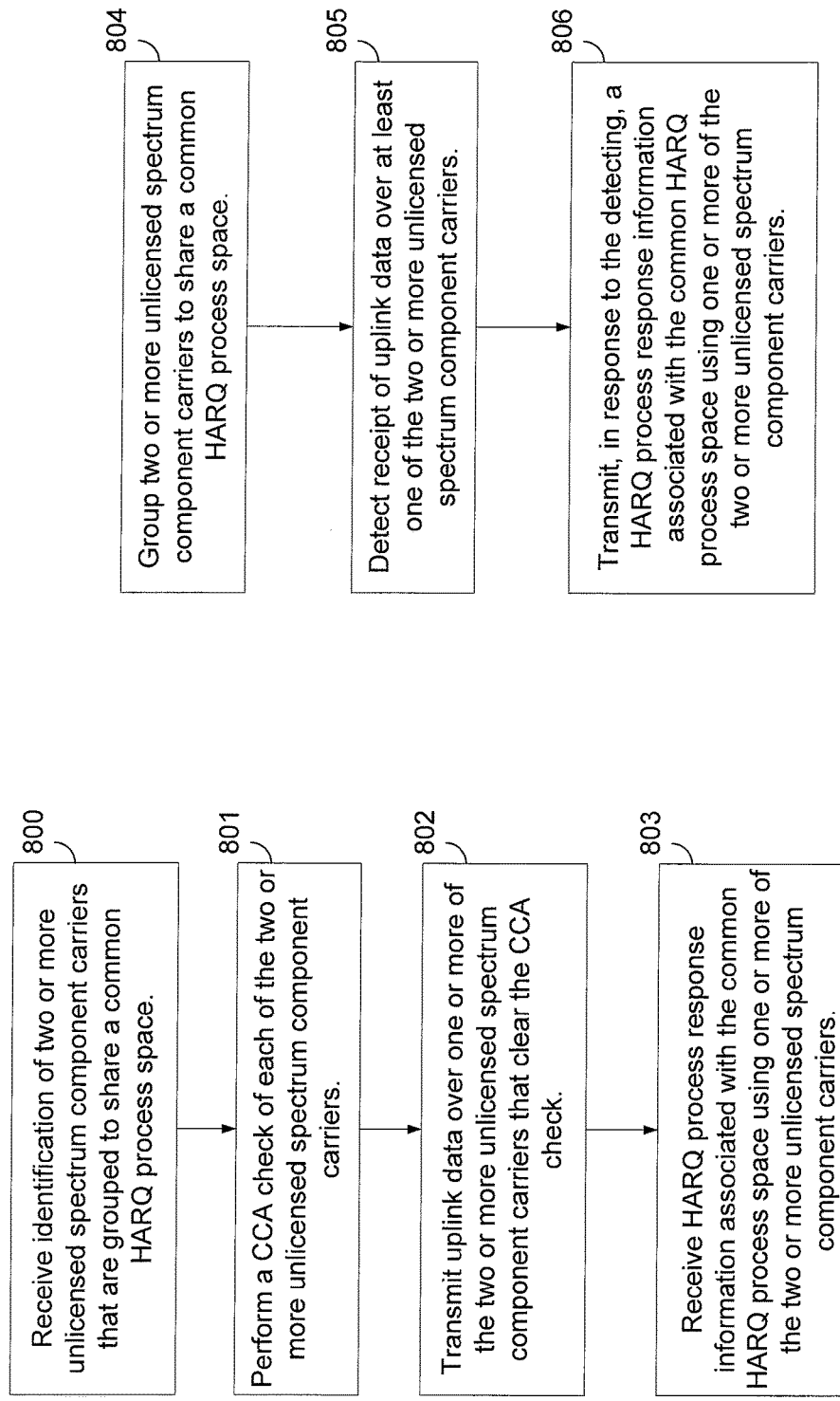

COMMON HARQ PROCESSES

CROSS-REFERENCE TO RELATED APPLICATIONS

This application claims the benefit of U.S. Provisional Patent Application No. 61/869,432, entitled, "COMMON HARQ PROCESSES", filed on Aug. 23, 2013, which is expressly incorporated by reference herein in its entirety.

BACKGROUND

Field

Aspects of the present disclosure relate generally to wireless communication systems, and more particularly, to common hybrid automatic repeat request (HARQ) processes across multiple carriers in long term evolution (LTE)/LTE-Advanced (LTE-A) communications systems with unlicensed spectrum.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes grouping, by a base station, two or more unlicensed spectrum component carriers of a plurality of component carriers assigned for communication by the base station to share a common hybrid automatic repeat request (HARQ) process space, performing, by the base station, a clear channel access (CCA) check of each of the two or more unlicensed spectrum component carriers, transmitting, by the base station, downlink data over one or more of the two or more unlicensed spectrum component carriers that clear the CCA check, and receiving, by the base station, in response to the transmitting, HARQ process response information associated with the common HARQ process space, wherein the HARQ process response information is received over the one or more of the two or more unlicensed spectrum component carriers that the downlink data was transmitted.

In an additional aspect of the disclosure, a method of wireless communication includes receiving, at a UE from a serving base station, identification of two or more unlicensed spectrum component carriers of a plurality of component carriers assigned for communication with the serving base station that are grouped to share a common HARQ process space, detecting, by the UE, receipt of downlink data over at least one of the two or more unlicensed spectrum component carriers of the identification, and transmitting, by the UE to the serving base station, in response to the detecting, HARQ process response information associated with the common HARQ process space using at least one of the two or more unlicensed spectrum component carriers.

In an additional aspect of the disclosure, a method of wireless communication including receiving, at a UE from a serving base station, identification of two or more unlicensed spectrum component carriers of a plurality of component carriers assigned for communication with the serving base station that are grouped to share a common HARQ process space, performing, by the UE, a CCA check of each of the two or more unlicensed spectrum component carriers, transmitting, by the UE, uplink data over one or more of the two or more unlicensed spectrum component carriers that clear the CCA check, and receiving, by the UE, in response to the transmitting, HARQ process response information associated with the common HARQ process space, wherein the HARQ process response information is received over the one or more of the two or more unlicensed spectrum component carriers that the uplink data was transmitted.

In an additional aspect of the disclosure, a method of wireless communication includes grouping, by a base station, two or more unlicensed spectrum component carriers of a plurality of component carriers assigned for communication by the base station to share a common HARQ process space, detecting, by the base station, receipt of uplink data from a UE over at least one of the two or more unlicensed spectrum component carriers, and transmitting, by the base station to the UE, in response to the detecting, HARQ process response information associated with the common HARQ process space, wherein the HARQ process response information is transmitted using at least one of the two or more unlicensed spectrum component carriers on which the uplink data receipt is detected.

In an additional aspect of the disclosure, an apparatus configured for wireless communication includes means for grouping, by a base station, two or more unlicensed spectrum component carriers of a plurality of component carriers assigned for communication by the base station to share a common HARQ process space, means for performing, by the base station, a CCA check of each of the two or more unlicensed spectrum component carriers, means for transmitting, by the base station, downlink data over one or more of the two or more unlicensed spectrum component carriers that clear the CCA check, and means for receiving, by the base station, in response to the means for transmitting, HARQ process response information associated with the common HARQ process space, wherein the HARQ process response information is received over the one or more of the two or more unlicensed spectrum component carriers that the downlink data was transmitted.

In an additional aspect of the disclosure, an apparatus configured for wireless communication includes means for receiving, at a UE from a serving base station, identification of two or more unlicensed spectrum component carriers of a plurality of component carriers assigned for communication with the serving base station that are grouped to share a common HARQ process space, means for performing, by the UE, a CCA check of each of the two or more unlicensed spectrum component carriers, means for transmitting, by the UE, uplink data over one or more of the two or more unlicensed spectrum component carriers that clear the CCA check, and means for receiving, by the UE, in response to the means for transmitting, HARQ process response information associated with the common HARQ process space, wherein the HARQ process response information is received over the one or more of the two or more unlicensed spectrum component carriers that the uplink data was transmitted.

In an additional aspect of the disclosure, an apparatus configured for wireless communication includes means for receiving, at a UE from a serving base station, identification of two or more unlicensed spectrum component carriers of a plurality of component carriers assigned for communication with the serving base station that are grouped to share a common HARQ process space, means for performing, by the UE, a CCA check of each of the two or more unlicensed spectrum component carriers, means for transmitting, by the UE, uplink data over one or more of the two or more unlicensed spectrum component carriers that clear the CCA check, and means for receiving, by the UE, in response to the means for transmitting, HARQ process response information associated with the common HARQ process space, wherein the HARQ process response information is received over the one or more of the two or more unlicensed spectrum component carriers that the uplink data was transmitted.

In an additional aspect of the disclosure, an apparatus configured for wireless communication includes means for grouping, by a base station, two or more unlicensed spectrum component carriers of a plurality of component carriers assigned for communication by the base station to share a common HARQ process space, means for detecting, by the base station, receipt of uplink data from a UE over at least one of the two or more unlicensed spectrum component carriers, and means for transmitting, by the base station to the UE, in response to the means for detecting, HARQ process response information associated with the common HARQ process space, wherein the HARQ process response information is transmitted using at least one of the two or more unlicensed spectrum component carriers on which the uplink data receipt is detected.

In an additional aspect of the disclosure, a non-transitory computer-readable medium having program code recorded thereon includes program code for causing a computer group, by a base station, two or more unlicensed spectrum component carriers of a plurality of component carriers assigned for communication by the base station to share a common HARQ process space, code to perform, by the base station, a CCA check of each of the two or more unlicensed spectrum component carriers, code to transmit, by the base station, downlink data over one or more of the two or more unlicensed spectrum component carriers that clear the CCA check, and code to receive, by the base station, in response to execution of the code to transmit, HARQ process response information associated with the common HARQ process space, wherein the HARQ process response information is received over the one or more of the two or more unlicensed spectrum component carriers that the downlink data was transmitted.

In an additional aspect of the disclosure, a non-transitory computer-readable medium having program code recorded thereon includes program code to receive, at a UE from a serving base station, identification of two or more unlicensed spectrum component carriers of a plurality of component carriers assigned for communication with the serving base station that are grouped to share a common HARQ process space, code to detect, by the UE, receipt of downlink data over at least one of the two or more unlicensed spectrum component carriers of the identification, and code to transmit, by the UE to the serving base station, in response to execution of the code to detect, HARQ process response information associated with the common HARQ process space using at least one of the two or more unlicensed spectrum component carriers.

In an additional aspect of the disclosure, a non-transitory computer-readable medium having program code recorded thereon includes program code to receive, at a UE from a serving base station, identification of two or more unlicensed spectrum component carriers of a plurality of component carriers assigned for communication with the serving base station that are grouped to share a common HARQ process space, code to perform, by the UE, a CCA check of each of the two or more unlicensed spectrum component carriers, code to transmit, by the UE, uplink data over one or more of the two or more unlicensed spectrum component carriers that clear the CCA check, and code to receive, by the UE, in response to execution of the code to transmit, HARQ process response information associated with the common HARQ process space, wherein the HARQ process response information is received over the one or more of the two or more unlicensed spectrum component carriers that the uplink data was transmitted.

In an additional aspect of the disclosure, a non-transitory computer-readable medium having program code recorded thereon includes program code to group, by a base station, two or more unlicensed spectrum component carriers of a plurality of component carriers assigned for communication by the base station to share a common HARQ process space, code to detect, by the base station, receipt of uplink data from a UE over at least one of the two or more unlicensed spectrum component carriers, and code to transmit, by the base station to the UE, in response to execution of the code to detect, HARQ process response information associated with the common HARQ process space, wherein the HARQ process response information is transmitted using at least one of the two or more unlicensed spectrum component carriers on which the uplink data receipt is detected.

In an additional aspect of the disclosure, an apparatus includes at least one processor and a memory coupled to the processor. The processor is configured to group, by a base station, two or more unlicensed spectrum component carriers of a plurality of component carriers assigned for communication by the base station to share a common HARQ process space, to perform, by the base station, a CCA check of each of the two or more unlicensed spectrum component carriers, to transmit, by the base station, downlink data over one or more of the two or more unlicensed spectrum component carriers that clear the CCA check, and to receive, by the base station, in response to execution of the configuration of the at least one processor to transmit, HARQ process response information associated with the common HARQ process space, wherein the HARQ process response information is received over the one or more of the two or more unlicensed spectrum component carriers that the downlink data was transmitted.

In an additional aspect of the disclosure, an apparatus includes at least one processor and a memory coupled to the processor. The processor is configured to receive, at a UE from a serving base station, identification of two or more unlicensed spectrum component carriers of a plurality of component carriers assigned for communication with the serving base station that are grouped to share a common HARQ process space, to detect, by the UE, receipt of downlink data over at least one of the two or more unlicensed spectrum component carriers of the identification, and to transmit, by the UE to the serving base station, in response to execution of the configuration of the at least one processor to detect, HARQ process response information associated with the common HARQ process space using at least one of the two or more unlicensed spectrum component carriers.

In an additional aspect of the disclosure, an apparatus includes at least one processor and a memory coupled to the processor. The processor is configured to receive, at a UE from a serving base station, identification of two or more unlicensed spectrum component carriers of a plurality of component carriers assigned for communication with the serving base station that are grouped to share a common HARQ process space, code to perform, by the UE, a CCA check of each of the two or more unlicensed spectrum component carriers, to transmit, by the UE, uplink data over one or more of the two or more unlicensed spectrum component carriers that clear the CCA check, and to receive, by the UE, in response to execution of the configuration of the at least one processor to transmit, HARQ process response information associated with the common HARQ process space, wherein the HARQ process response information is received over the one or more of the two or more unlicensed spectrum component carriers that the uplink data was transmitted.

In an additional aspect of the disclosure, an apparatus includes at least one processor and a memory coupled to the processor. The processor is configured to group, by a base station, two or more unlicensed spectrum component carriers of a plurality of component carriers assigned for communication by the base station to share a common HARQ process space, to detect, by the base station, receipt of uplink data from a UE over at least one of the two or more unlicensed spectrum component carriers, and to transmit, by the base station to the UE, in response to execution of the configuration of the at least one processor to detect, HARQ process response information associated with the common HARQ process space, wherein the HARQ process response information is transmitted using at least one of the two or more unlicensed spectrum component carriers on which the uplink data receipt is detected.

BRIEF DESCRIPTION OF THE DRAWINGS

FIGS. 8A and 8B are functional block diagrams illustrating example blocks executed to implement one aspect of the present disclosure from an uplink transmission perspective.

DETAILED DESCRIPTION

Figure 1:
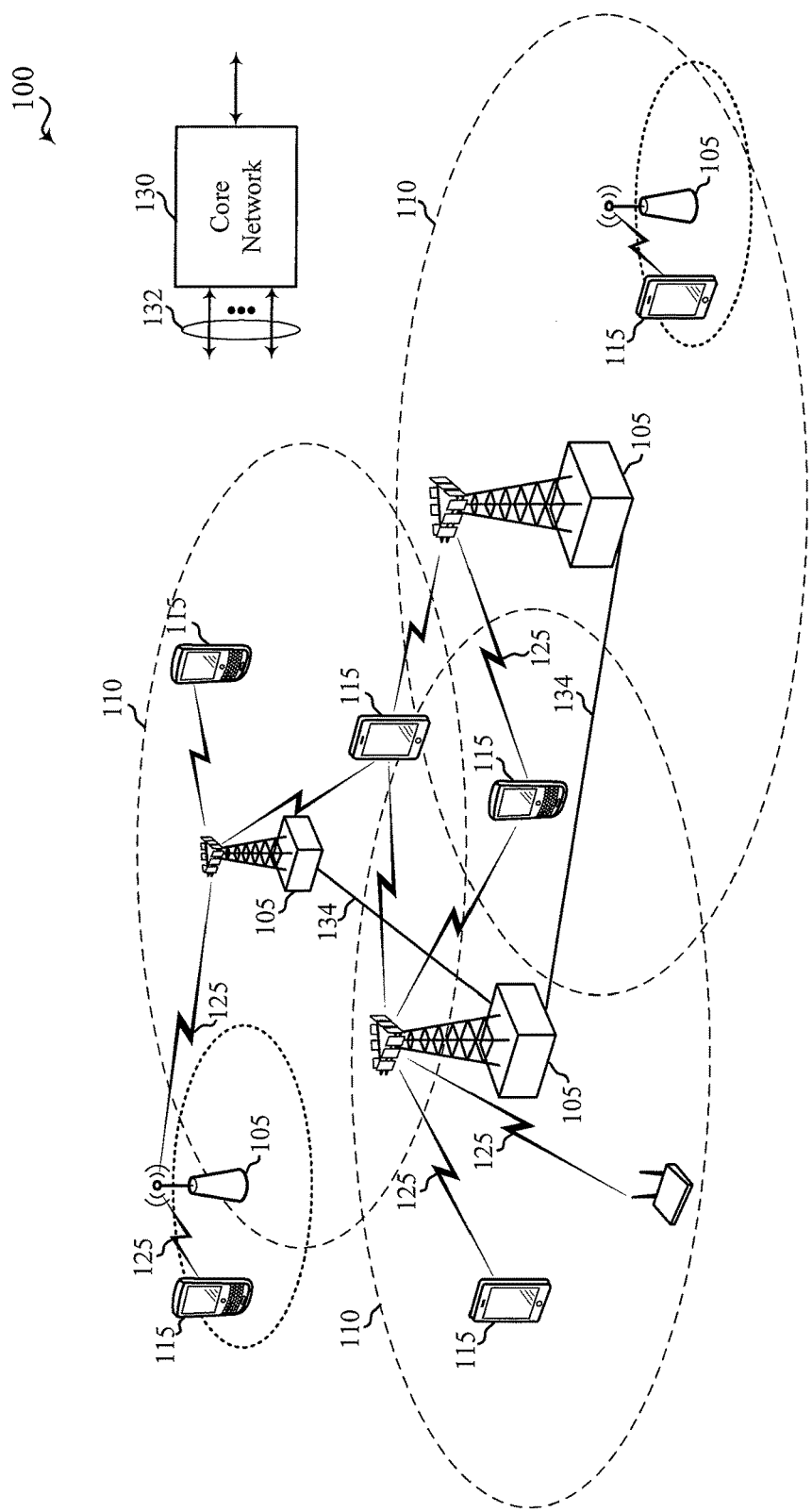
FIG. 1 shows a diagram that illustrates an example of a wireless communications system according to various embodiments.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Operators have so far looked at WiFi as the primary mechanism to use unlicensed spectrum to relieve ever increasing levels of congestion in cellular networks. However, a new carrier type (NCT) based on LTE in an unlicensed spectrum may be compatible with carrier-grade WiFi, making LTE/LTE-A with unlicensed spectrum an alternative to WiFi. LTE/LTE-A with unlicensed spectrum may leverage LTE concepts and may introduce some modifications to physical layer (PHY) and media access control (MAC) aspects of the network or network devices to provide efficient operation in the unlicensed spectrum and to meet regulatory requirements. The unlicensed spectrum may range from 600 Megahertz (MHz) to 6 Gigahertz (GHz), for example. In some scenarios, LTE/LTE-A with unlicensed spectrum may perform significantly better than WiFi. For example, an all LTE/LTE-A deployment with unlicensed spectrum (for single or multiple operators) compared to an all WiFi deployment, or when there are dense small cell deployments, LTE/LTE-A with unlicensed spectrum may perform significantly better than WiFi. LTE/LTE-A with unlicensed spectrum may perform better than WiFi in other scenarios such as when LTE/LTE-A with unlicensed spectrum is mixed with WiFi (for single or multiple operators).

For a single service provider (SP), an LTE/LTE-A network on an unlicensed spectrum may be configured to be synchronous with a LTE network on the licensed spectrum. However, LTE/LTE-A networks with unlicensed spectrum deployed on a given channel by multiple SPs may be configured to be synchronous across the multiple SPs. One approach to incorporate both the above features may involve using a constant timing offset between LTE/LTE-A with and without unlicensed spectrum for a given SP. An LTE/LTE-A network with unlicensed spectrum may provide unicast and/or multicast services according to the needs of the SP. Moreover, an LTE/LTE-A network with unlicensed spectrum may operate in a bootstrapped mode in which LTE cells act as anchor and provide relevant cell information (e.g., radio frame timing, common channel configuration, system frame number or SFN, etc.). In this mode, there may be close interworking between LTE/LTE-A with and without unlicensed spectrum. For example, the bootstrapped mode may support the supplemental downlink and the carrier aggregation modes described above. The PHY-MAC layers of the LTE/LTE-A network with unlicensed spectrum may operate in a standalone mode in which the LTE/LTE-A network with unlicensed spectrum operates independently from an LTE network without unlicensed spectrum. In this case, there may be a loose interworking between LTE/LTE-A with and without unlicensed spectrum based on RLC-level aggregation with co-located LTE/LTE-A cells with and without unlicensed spectrum, or multiflow across multiple cells and/or base stations, for example.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system or network 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

In some embodiments, the system 100 is an LTE/LTE-A network that supports one or more communication modes of operation or deployment scenarios over unlicensed spectrum. In other embodiments, the system 100 may support wireless communications using an unlicensed spectrum and an access technology different from LTE/LTE-A with unlicensed spectrum, or a licensed spectrum and an access technology different from LTE/LTE-A. The terms evolved Node B (eNB) and user equipment (UE) may be generally used to describe the base stations 105 and devices 115, respectively. The system 100 may be a Heterogeneous LTE/LTE-A network with and without unlicensed spectrum in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul links 132 (e.g., through core network 130). The system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 are dispersed throughout the system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communications links 125 shown in system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions. The downlink transmissions may be made using a licensed spectrum, an unlicensed spectrum, or both. Similarly, the uplink transmissions may be made using a licensed spectrum, an unlicensed spectrum, or both.

In some embodiments of the system 100, various deployment scenarios for LTE/LTE-A with unlicensed spectrum may be supported including a supplemental downlink (SDL) mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. Base stations 105 as well as UEs 115 may support one or more of these or similar modes of operation. OFDMA communications signals may be used in the communications links 125 for LTE downlink transmissions in an unlicensed spectrum, while SC-FDMA communications signals may be used in the communications links 125 for LTE uplink transmissions in an unlicensed spectrum. Additional details regarding the implementation of LTE/LTE-A deployment scenarios or modes of operation with unlicensed spectrum in a system such as the system 100, as well as other features and functions related to the operation of LTE/LTE-A with unlicensed spectrum, are provided below with reference to FIGS. 2A-8B.

Figure 2A:
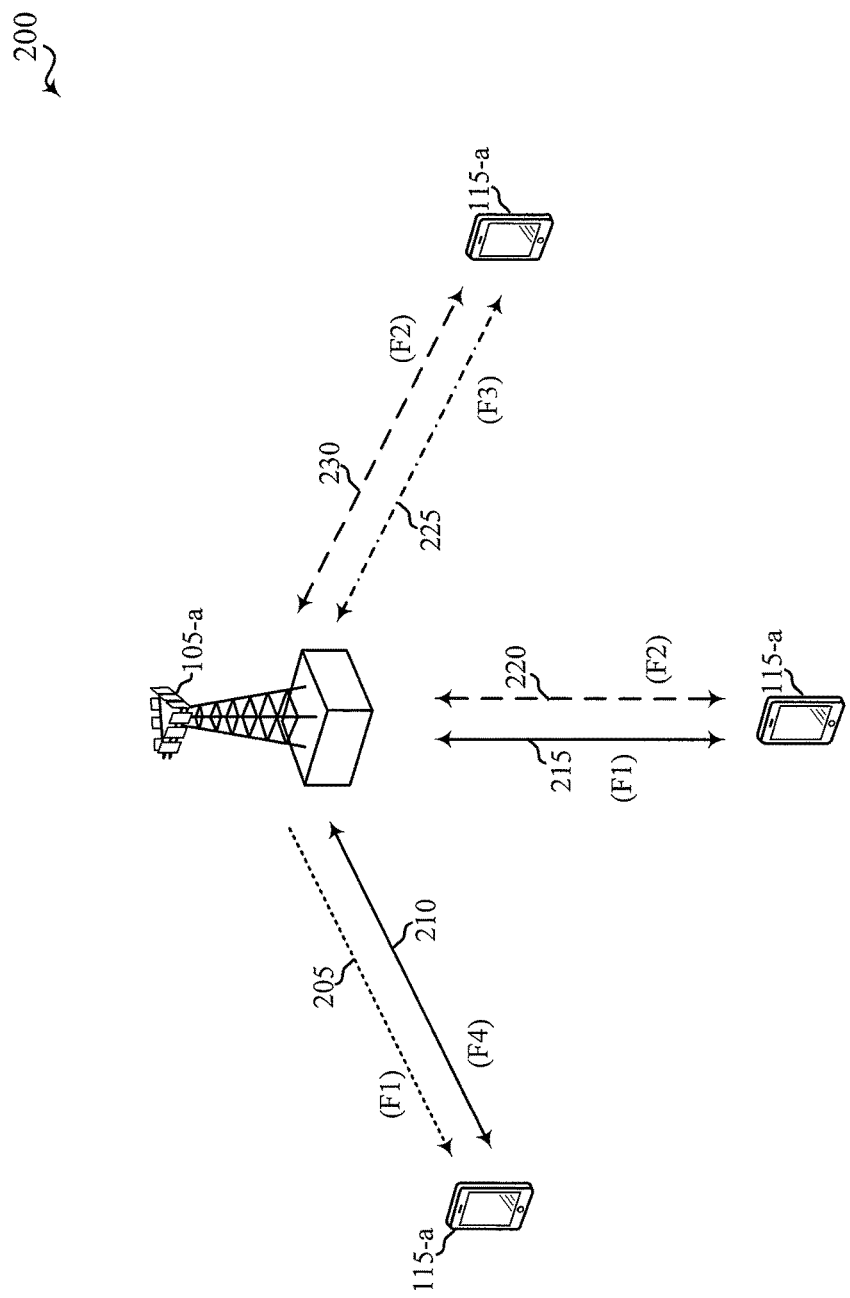
FIG. 2A shows a diagram that illustrates examples of deployment scenarios for using LTE in an unlicensed spectrum according to various embodiments.

Turning next to FIG. 2A, a diagram 200 shows examples of a supplemental downlink mode and of a carrier aggregation mode for an LTE network that supports LTE/LTE-A with unlicensed spectrum. The diagram 200 may be an example of portions of the system 100 of FIG. 1. Moreover, the base station 105-a may be an example of the base stations 105 of FIG. 1, while the UEs 115-a may be examples of the UEs 115 of FIG. 1.

In the example of a supplemental downlink mode in diagram 200, the base station 105-a may transmit OFDMA communications signals to a UE 115-a using a downlink 205. The downlink 205 is associated with a frequency F1 in an unlicensed spectrum. The base station 105-a may transmit OFDMA communications signals to the same UE 115-a using a bidirectional link 210 and may receive SC-FDMA communications signals from that UE 115-a using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-a. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 105-a may transmit OFDMA communications signals to a UE 115-a using a bidirectional link 215 and may receive SC-FDMA communications signals from the same UE 115-a using the bidirectional link 215. The bidirectional link 215 is associated with the frequency F1 in the unlicensed spectrum. The base station 105-a may also transmit OFDMA communications signals to the same UE 115-a using a bidirectional link 220 and may receive SC-FDMA communications signals from the same UE 115-a using the bidirectional link 220. The bidirectional link 220 is associated with a frequency F2 in a licensed spectrum. The bidirectional link 215 may provide a downlink and uplink capacity offload for the base station 105-a. Like the supplemental downlink described above, this scenario may occur with any service provider (e.g., MNO) that uses a licensed spectrum and needs to relieve some of the traffic and/or signaling congestion.

In another example of a carrier aggregation mode in diagram 200, the base station 105-a may transmit OFDMA communications signals to a UE 115-a using a bidirectional link 225 and may receive SC-FDMA communications signals from the same UE 115-a using the bidirectional link 225. The bidirectional link 225 is associated with the frequency F3 in an unlicensed spectrum. The base station 105-a may also transmit OFDMA communications signals to the same UE 115-a using a bidirectional link 230 and may receive SC-FDMA communications signals from the same UE 115-a using the bidirectional link 230. The bidirectional link 230 is associated with the frequency F2 in the licensed spectrum. The bidirectional link 225 may provide a downlink and uplink capacity offload for the base station 105-a. This example and those provided above are presented for illustrative purposes and there may be other similar modes of operation or deployment scenarios that combine LTE/LTE-A with and without unlicensed spectrum for capacity offload.

As described above, the typical service provider that may benefit from the capacity offload offered by using LTE in an unlicensed band is a traditional MNO with LTE spectrum. For these service providers, an operational configuration may include a bootstrapped mode (e.g., supplemental downlink, carrier aggregation) that uses the LTE primary component carrier (PCC) on the licensed spectrum and the secondary component carrier (SCC) on the unlicensed spectrum.

In the supplemental downlink mode, control for LTE/LTE-A with unlicensed spectrum may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in the unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary. A CCA procedure, whether performed by a base station or transmitting UE, may include a variety of different processes to discover whether or not a channel is currently occupied. For example, a CCA check may include simple detection of energy level against a predetermined threshold. A CCA check may also include additional procedures that attempt to correlate any detected signal to an actual transmission signal or may perform additional detection over multiple slots or any combination of different detection procedures. For purposes of this application a CCA procedure includes various procedures that detect the presence of a transmission signal on a particular channel.

In the carrier aggregation mode, data and control may be communicated in LTE (e.g., bidirectional links 210, 220, and 230) while data may be communicated in LTE/LTE-A with unlicensed spectrum (e.g., bidirectional links 215 and 225). The carrier aggregation mechanisms supported when using LTE/LTE-A with unlicensed spectrum may fall under a hybrid frequency division duplexing-time division duplexing (FDD-TDD) carrier aggregation or a TDD-TDD carrier aggregation with different symmetry across component carriers.

Figure 2B:
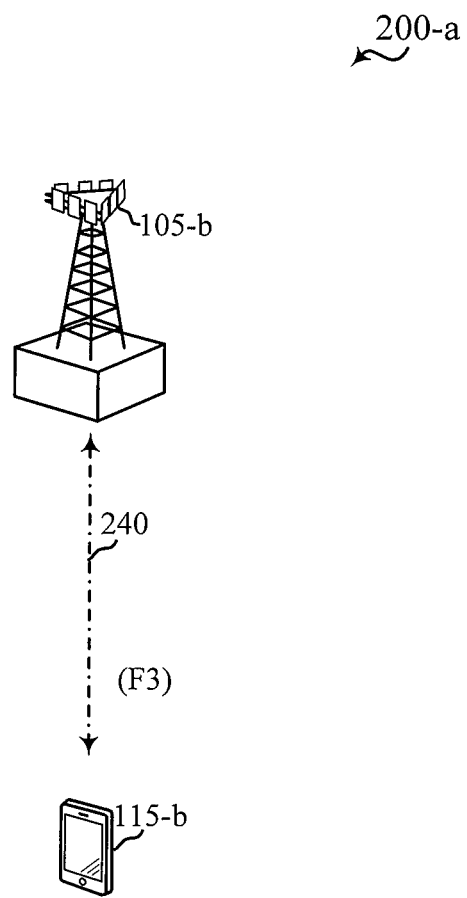
FIG. 2B shows a diagram that illustrates another example of a deployment scenario for using LTE in an unlicensed spectrum according to various embodiments.

FIG. 2B shows a diagram 200-a that illustrates an example of a standalone mode for LTE/LTE-A with unlicensed spectrum. The diagram 200-a may be an example of portions of the system 100 of FIG. 1. Moreover, the base station 105-b may be an example of the base stations 105 of FIG. 1 and the base station 105-a of FIG. 2A, while the UE 115-b may be an example of the UEs 115 of FIG. 1 and the UEs 115-a of FIG. 2A.

In the example of a standalone mode in diagram 200-a, the base station 105-b may transmit OFDMA communications signals to the UE 115-b using a bidirectional link 240 and may receive SC-FDMA communications signals from the UE 115-b using the bidirectional link 240. The bidirectional link 240 is associated with the frequency F3 in an unlicensed spectrum described above with reference to FIG. 2A. The standalone mode may be used in non-traditional wireless access scenarios, such as in-stadium access (e.g., unicast, multicast). The typical service provider for this mode of operation may be a stadium owner, cable company, event hosts, hotels, enterprises, and large corporations that do not have licensed spectrum. For these service providers, an operational configuration for the standalone mode may use the LTE/LTE-A PCC on the unlicensed spectrum. Moreover, LBT may be implemented on both the base station and the UE.

Figure 3:
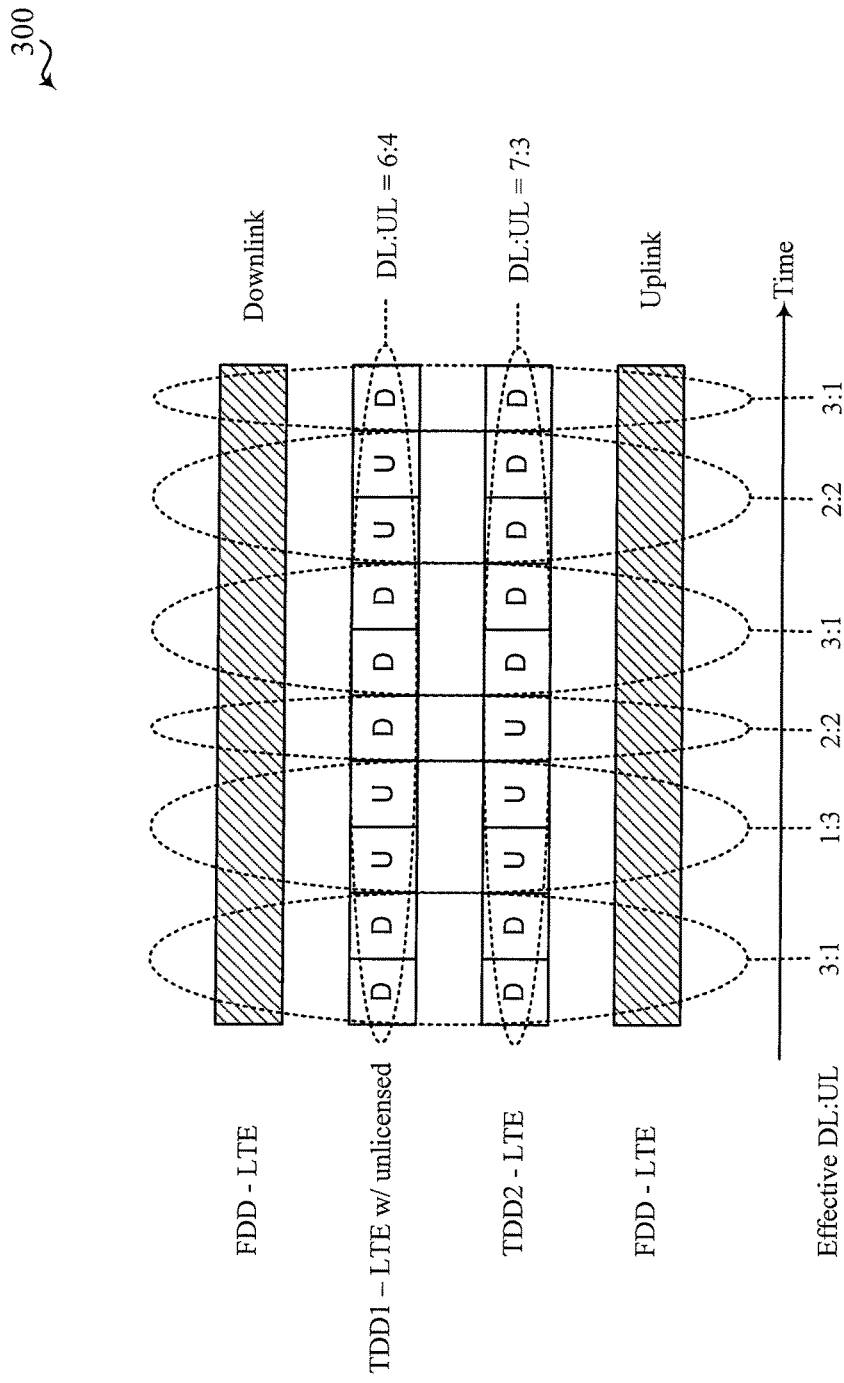
FIG. 3 shows a diagram that illustrates an example of carrier aggregation when using LTE concurrently in licensed and unlicensed spectrum according to various embodiments.

Turning next to FIG. 3, a diagram 300 illustrates an example of carrier aggregation when using LTE concurrently in licensed and unlicensed spectrum according to various embodiments. The carrier aggregation scheme in diagram 300 may correspond to the hybrid FDD-TDD carrier aggregation described above with reference to FIG. 2A. This type of carrier aggregation may be used in at least portions of the system 100 of FIG. 1. Moreover, this type of carrier aggregation may be used in the base stations 105 and 105-a of FIG. 1 and FIG. 2A, respectively, and/or in the UEs 115 and 115-a of FIG. 1 and FIG. 2A, respectively.

In this example, an FDD (FDD-LTE) may be performed in connection with LTE in the downlink, a first TDD (TDD1) may be performed in connection with LTE/LTE-A with unlicensed spectrum, a second TDD (TDD2) may be performed in connection with LTE, and another FDD (FDD-LTE) may be performed in connection with LTE in the uplink. TDD1 results in a DL:UL ratio of 6:4, while the ratio for TDD2 is 7:3. On the time scale, the different effective DL:UL ratios are 3:1, 1:3, 2:2, 3:1, 2:2, and 3:1. This example is presented for illustrative purposes and there may be other carrier aggregation schemes that combine the operations of LTE/LTE-A with and without unlicensed spectrum.

Figure 4:
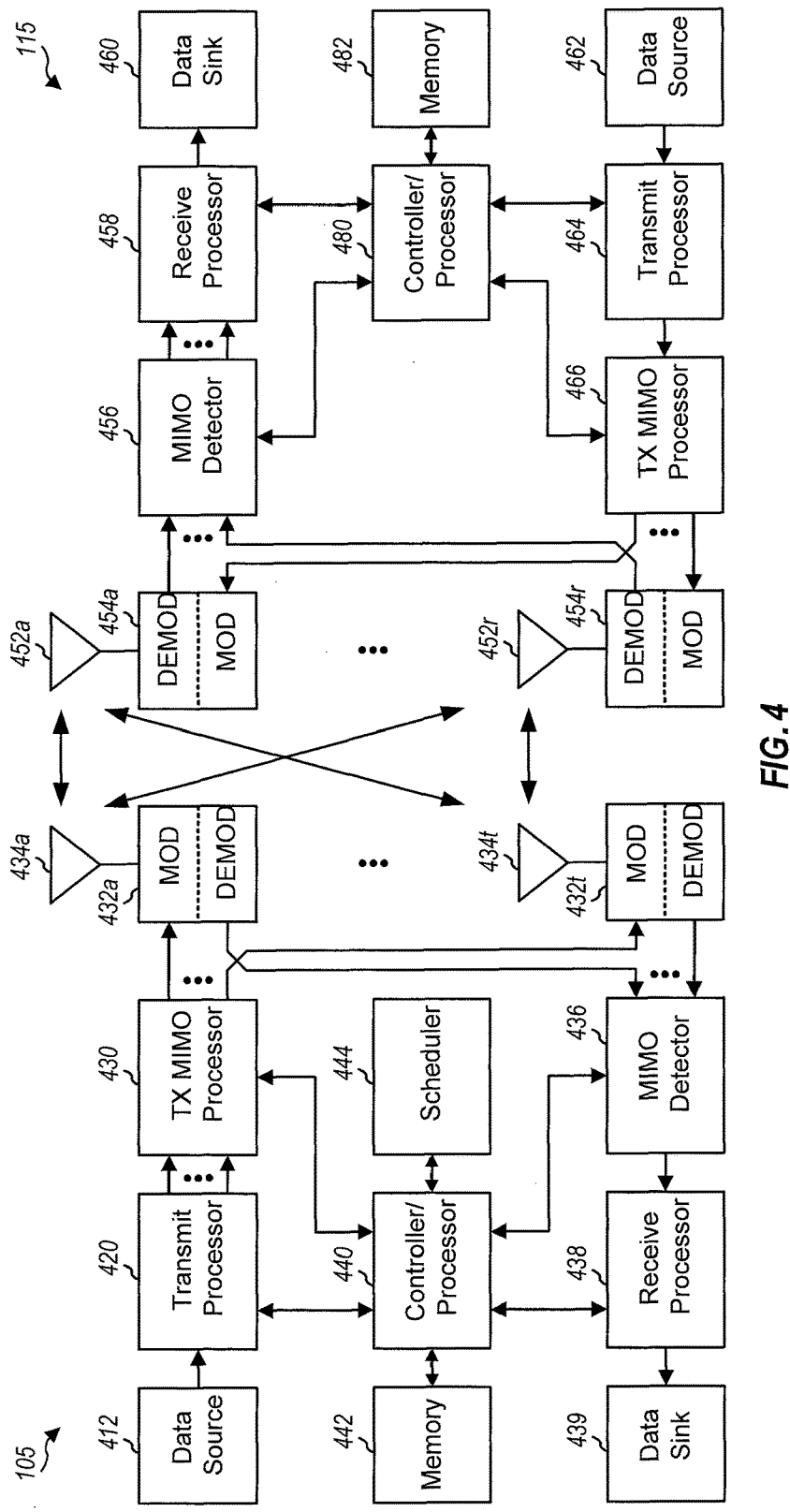
FIG. 4 is a block diagram conceptually illustrating a design of a base station/eNB and a UE configured according to one aspect of the present disclosure.

FIG. 4 shows a block diagram of a design of a base station/eNB 105 and a UE 115, which may be one of the base stations/eNBs and one of the UEs in FIG. 1. The eNB 105 may be equipped with antennas 434a through 434t, and the UE 115 may be equipped with antennas 452a through 452r. At the eNB 105, a transmit processor 420 may receive data from a data source 412 and control information from a controller/processor 440. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 420 may process (e.g., encode and symbol map) the data and control information to obtain data symbols and control symbols, respectively. The transmit processor 420 may also generate reference symbols, e.g., for the primary synchronization signal (PSS), secondary synchronization signal (SSS), and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 115, the antennas 452*a* through 452*r* may receive the downlink signals from the eNB 105 and may provide received signals to the demodulators (DEMODs) 454*a* through 454*r*, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 115 to a data sink 460, and provide decoded control information to a controller/processor 480.

On the uplink, at the UE 115, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454*a* through 454*r* (e.g., for SC-FDM, etc.), and transmitted to the eNB 105. At the eNB 105, the uplink signals from the UE 115 may be received by the antennas 434, processed by the modulators 432, detected by a MIMO detector 436 if applicable, and further processed by a receive processor 438 to obtain decoded data and control information sent by the UE 115. The processor 438 may provide the decoded data to a data sink 439 and the decoded control information to the controller/processor 440.

The controllers/processors 440 and 480 may direct the operation at the eNB 105 and the UE 115, respectively. The controller/processor 440 and/or other processors and modules at the eNB 105 may perform or direct the execution of various processes for the techniques described herein. The controllers/processor 480 and/or other processors and modules at the UE 115 may also perform or direct the execution of the functional blocks illustrated in FIGS. 7A, 7B, 8A, and 8B, and/or other processes for the techniques described herein. The memories 442 and 482 may store data and program codes for the eNB 105 and the UE 115, respectively. A scheduler 444 may schedule UEs for data transmission on the downlink and/or uplink.

With the implementation of wireless technologies for communication using LTE/LTE-A with unlicensed spectrum, various adaptations may be desirable in order to accommodate LTE operations over an unlicensed band with efficiency and a little change from the current LTE standards as possible. For example, because channel access is not guaranteed over the unlicensed spectrum of LTE/LTE-A deployments with unlicensed spectrum, accommodations for hybrid automatic repeat request (HARQ) processes may be desirable.

Figures 5A, 5B:
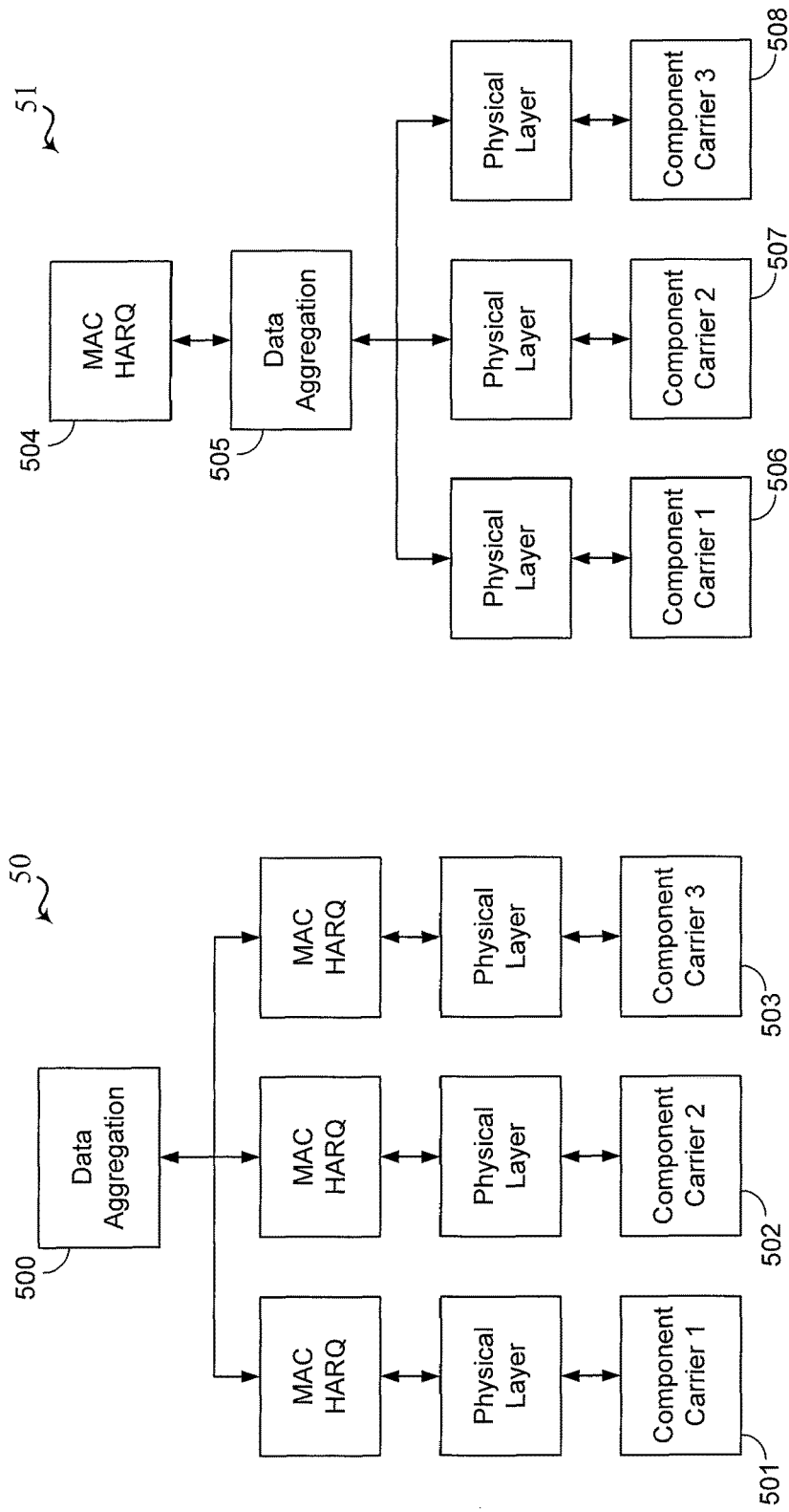
FIG. 5A is a block diagram illustrating an example MAC layer aggregation that may be used in existing LTE systems.
FIG. 5B is a block diagram illustrating an example PHY layer aggregation that may be applicable for LTE/LTE-A deployments with unlicensed spectrum configured according to one aspect of the present disclosure.

In current LTE systems, each component carrier (CC) has an independent HARQ process and uses media access control (MAC) layer data aggregation. FIG. 5A is a block diagram illustrating an example MAC layer aggregation 50 that may be used in existing LTE systems. MAC layer aggregation 50 splits the aggregated data at data aggregation 500 into separate MAC layers for each processing chain associated with component carriers 1-501-3-503 and employs an independent HARQ processes for each chain. While the MAC layer could potentially assign the same data over multiple CCs, the data transmitted on each CC is typically different. This operation is transparent to the physical (PHY) layer of an eNB and UE. Because of the independent processes and separate data transmitted on the different CCs, HARQ combining is not allowed between different CCs. Thus, re-transmissions for any common data on each CC will be independent of each other. The MAC layer will also discard any duplicate data obtained.

In LTE/LTE-A deployments with unlicensed spectrum, clear channel assessment (CCA) is performed independently for each CC. Because channel access on the unlicensed spectrum is not guaranteed, some CCs may obtain channel access while others do not. Each time CCA fails, transmission is delayed for 10 ms on that CC. Therefore, unless the MAC layer explicitly duplicates data on multiple CCs, there could be significant delays in the transmission of data packets over unlicensed spectrum. Delays may be tolerable with some ad hoc communication applications, but, for delay-sensitive applications, such as real-time voice and video, networked gaming, and the like, such delays are unacceptable.

Various aspects of the present disclosure provide for sharing the HARQ process space between CCs in order to reduce the latencies in communications over the unlicensed spectrum of LTE/LTE-A deployments with unlicensed spectrum. FIG. 5B is a block diagram illustrating an example PHY layer aggregation 51 applicable for LTE/LTE-A deployments with unlicensed spectrum configured according to one aspect of the present disclosure. PHY layer aggregation 51 splits the aggregated data at the PHY layer with data aggregation 505 into each separate processing chain for component carriers 1-506-3-508. This split at the PHY layer allows for common HARQ processes at MAC layer HARQ 504 that can be shared across component carriers 1-501-3-503. Common HARQ space efficiently supports transmission of the same data over multiple CCs, though the various aspects of the disclosure do not require such transmission of the same data over multiple CCs. Sharing a common HARQ process space over multiple CCs may also allow for soft combining capabilities whether the same data is transmitted over multiple CCs or re-transmitted over different CCs sharing the common HARQ space, which has the ability to significantly improve reliability in bursty interference scenarios.

It should be noted that PHY layer aggregation 51 is only one example configuration for implementation of shared or common HARQ processes in an LTE/LTE-A deployment with unlicensed spectrum. There may be other configurations that provide for shared HARQ processes and such shared process configurations, including PHY layer aggregation 51, may be applied to a first set of CCs, while the other CCs in the LTE/LTE-A deployment with unlicensed spectrum may employ independent HARQ processes, such as illustrated with MAC layer aggregation 50 of FIG. 5A.

Figure 6:
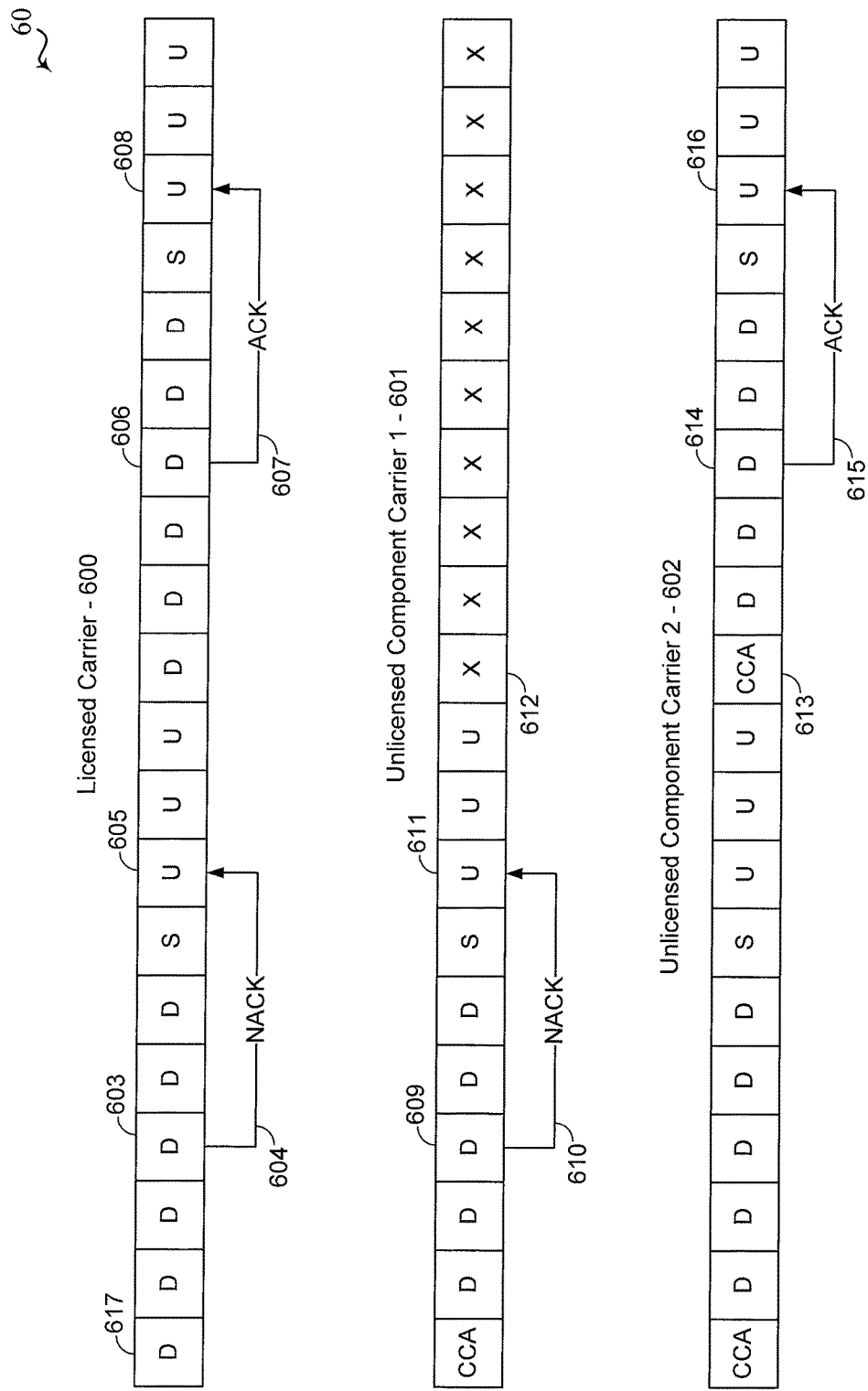
FIG. 6 is a block diagram illustrating time division duplex (TDD) carrier transmission streams in a mixed licensed/unlicensed LTE/LTE-A communication system configured according to one aspect of the present disclosure.

FIG. 6 is a block diagram illustrating time division duplex (TDD) carrier transmission streams in a mixed licensed/unlicensed LTE/LTE-A communication system 60 with unlicensed spectrum configured according to one aspect of the present disclosure. Mixed licensed/unlicensed LTE/LTE-A communication system 60 may include SDL or CA deployments of LTE/LTE-A with unlicensed spectrum communications having licensed carrier 600 and multiple unlicensed carriers, unlicensed component carrier 1-601 and unlicensed component carrier 2-602. Transmissions that occur over licensed carrier 600 are guaranteed. Thus, at downlink subframe 603, the eNB transmits downlink signals to the UE which are not accurately received by the UE. Accordingly, the UE transmits a NACK 604 four subframes later in uplink subframe 605. In response to the NACK signal, the eNB retransmits the downlink signals to the UE at downlink subframe 606. With this re-transmission, the UE accurately receives the signals and sends ACK signal 607 at uplink subframe 608. On licensed carrier 600, these transmissions by the eNB and UE are guaranteed. Thus, there would be no additional latency based on the transmission being unavailable.

Another set of data is transmitted by the eNB to the UE over unlicensed CCs, unlicensed component carrier 1-601 and unlicensed component carrier 2-602. Before transmitting over unlicensed spectrum in LTE/LTE-A deployments with unlicensed spectrum, the transmitter first performs a CCA check. If the transmitter detects a clear CCA, then it may proceed with transmissions over the next 10 ms. However, if the CCA check fails, then transmissions are delayed for 10 ms. For example, the eNB transmits downlink signals to the UE at downlink subframe 609 on unlicensed component carrier 1-601. The UE does not accurately receive the signals and, thus, transmits NACK 610 to the eNB in uplink subframe 611. In response to NACK 610, the eNB prepares for re-transmission of the downlink signals over unlicensed component carrier 1-601. However, at subframe 612, the CCA check fails, causing transmission on unlicensed component carrier 1-610 to be delayed for 10 ms. As such, the eNB would be incapable of re-transmitting the downlink signals that NACK 610 was received for.

If mixed licensed/unlicensed LTE/LTE-A communication system 60 were not configured to provide common HARQ processes shared over multiple CCs, re-transmission of the failed packets would be substantially delayed, which would cause unacceptable degradation of delay-sensitive applications. However, with common HARQ processing, the same re-transmission data is attempted for transmission on both of unlicensed component carrier 1-601 and unlicensed component carrier 2-602. The eNB performs a successful CCA check on unlicensed component carrier 2-602 at subframe 613. Accordingly, the data for re-transmission is successfully transmitted by the eNB in downlink subframe 614. The UE successfully receives the re-transmitted data and transmits ACK 615 at uplink subframe 616. Therefore, by providing a common HARQ process across both of unlicensed component carrier 1-601 and unlicensed component carrier 2-602, the re-transmission delay is avoided when the CCA check fails for unlicensed component carrier 1-601.

The carrier transmission streams illustrated in FIG. 6 may also provide illustration of the signaling and increased reliability that may be experienced in the various aspects that provide for the sharing of the common HARQ process space across multiple CCs. In order for the UE to know which group of CCs shares the common HARQ space, the serving base station provides signaling, such as through radio resource control (RRC) signaling that defines not only the group of CCs that share the common HARQ space but the priority sequence that the UE should use to access each CC to detect for the transmitted data. For example, with reference to FIG. 6, at downlink subframe 617, the base station provide RRC signaling that identifies unlicensed component carrier 1-601 and unlicensed component carrier 2-602 as being the set of CCs that share a common HARQ process space. Moreover, the RRC signaling provides for the UE to first access unlicensed component carrier 1-601 for the downlink data before accessing unlicensed component carrier 2-602, should the UE fail to detect the data on unlicensed component carrier 1-601.

It should be noted that, in various aspects of the present disclosure, multiple common HARQ process space may be designated in which the base station may designate various groups of CCs to share access. Each of the available CCs may be assigned to multiple of such different common HARQ process spaces.

Using this priority sequence, the UE check for the downlink data at subframe 609 of unlicensed component carrier 1-601 before checking unlicensed component carrier 2-602. When the CCA check fails at subframe 612, the UE moves to detect whether the downlink data is received at subframe 614 of unlicensed component carrier 2-602. Because the downlink data is being transmitted over both unlicensed component carrier 1-601 and unlicensed component carrier 2-602 sharing a common HARQ process space, as well as licensed carrier 601, the successful receive of the downlink data at subframe 614, may not be successful because signal was recognized solely from the downlink subframe 614. Instead, the UE may use soft combining, combining any data that was received in both of the unsuccessful downlink subframes 603 and 609 and the data received in subframe 614 in order to successfully receive the downlink data. Using the soft combining, the UE may have a statistically better chance at decoding the transmitted data.

Various aspects of the present disclosure that provide for shared HARQ processes across multiple CCs may allow for implementation of certain operations which would have otherwise been unavailable using unlicensed spectrum. For example, semi-persistent scheduling (SPS) is an operation that is used in LTE systems for services, such voice over internet protocol (VoIP), where data arrives periodically. With SPS, the eNB assigns a predefined set of radio resources for VoIP users with a certain interval, such as 20 ms. Because of this interval, the UE would not be required to request resources for each transmission time interval (TTI), which saves control overhead. This type of scheduling is semi-persistent in the sense that the eNB may change the resource allocation type or location if required for link adaptation or other factors.

For LTE systems, SPS is restricted to the primary CC and is not used for other secondary CCs. In LTE/LTE-A deployments with unlicensed spectrum, the licensed carrier can be used for SPS in SDL and/or CA modes. However, in an LTE/LTE-A with unlicensed spectrum SA mode, there is no licensed carrier to fall back on. Thus, the quality and experience of the periodic data application, such as the voice quality in VoIP applications, or video quality in real-time video application, may be degraded if channel access is not obtained at nearly the same periodicity in the SA mode. Using common HARQ processes shared across different CCs, as provided in various aspects of the present disclosure, the transmitter may significantly improve the chances of obtaining successful channel access of at least one of the CCs. By using the same set of resources and transmitting the same data on different CCs, there may be a significant improvement in operation of such application in an LTE/LTE-A with unlicensed spectrum SA mode with soft combining of data allowed across CCs. Thus, application of common HARQ processes may make SPS available for LTE/LTE-A with unlicensed spectrum SA deployments and may also be used to temporarily offload periodic data application communications, such as VoIP calls or real-time video, to the unlicensed bands in SDL or CA mode.

Currently, each downlink component carrier uses eight HARQ processes. The specific HARQ process is indicated in a grant included in the PDCCH by a 3-bit HARQ process indicator. Adaptation of common HARQ processes according to the various aspects of the present disclosure to the existing HARQ process configuration may be implemented in several different ways. The HARQ process space may be divided into common and private sets. For example, the existing eight HARQ processes could be divided into six private HARQ processes for each CC and two common HARQ processes shared across a several (pre-defined) CCs. Other options could provide for four private HARQ processes for each CC and four common HARQ processes shared across the multiple CCS. The various sets of carriers sharing the common HARQ processes and the order in which the UEs should access these carriers may be indicated in radio resource control (RRC) signaling from the eNB. Thus, the UE will know which CCs share common HARQ processes and will know the order of CCs to access to retrieve the transmitted data, if no data is transmitted on the expected or higher-priority CCS.

Additional aspects of the present disclosure may also add bits to the HARQ process indicator in order to accommodate more common HARQ processes. For example, by increasing the number of bits in the indicator, eight private HARQ process may be defined for each CC while four extra common HARQ processes are shared across multiple CCs. When one of the HARQ indicators associated with a common HARQ process is used, ACK/NACK and/or re-transmissions can be expected by the UE on more than one of the CCs. In the case of re-transmissions, the new data indicator (NDI) bit would be set to indicate no new data. By receiving this common HARQ indicator, the UE will know which CCs share the HARQ process and know the sequence with which to check each CC for the ACK/NACK and/or re-transmission.

Common HARQ processes may also be applicable for uplink at the UE. For LTE/LTE-A uplink communications over unlicensed spectrum, the UE also performs CCA to obtain channel access. If a UE does not obtain a clear CCA, it cannot access any of the uplink subframes. Various aspects of the present disclosure provide for the UE to use common HARQ space across multiple CCs in order to transmit uplink data on other CCs when an uplink transmission on a first CC fails because the UE does not detect a clear CCA on that CC. This shared common HARQ space operation may also be applied for transmission time interval (TTI) bundling of uplink transmissions in periodic data applications, such as VoIP, which typically bundles VoIP traffic across four uplink subframes. Thus, if a UE does not obtain channel access with a successful CCA in the next TTI, application of common HARQ space allows the UE to use other CCs to bundle the voice data. This shared common HARQ operation prevent significant delays from occurring in transmissions over the unlicensed spectrum of various LTE/LTE-A deployments with unlicensed spectrum.

Figures 7A, 7B:
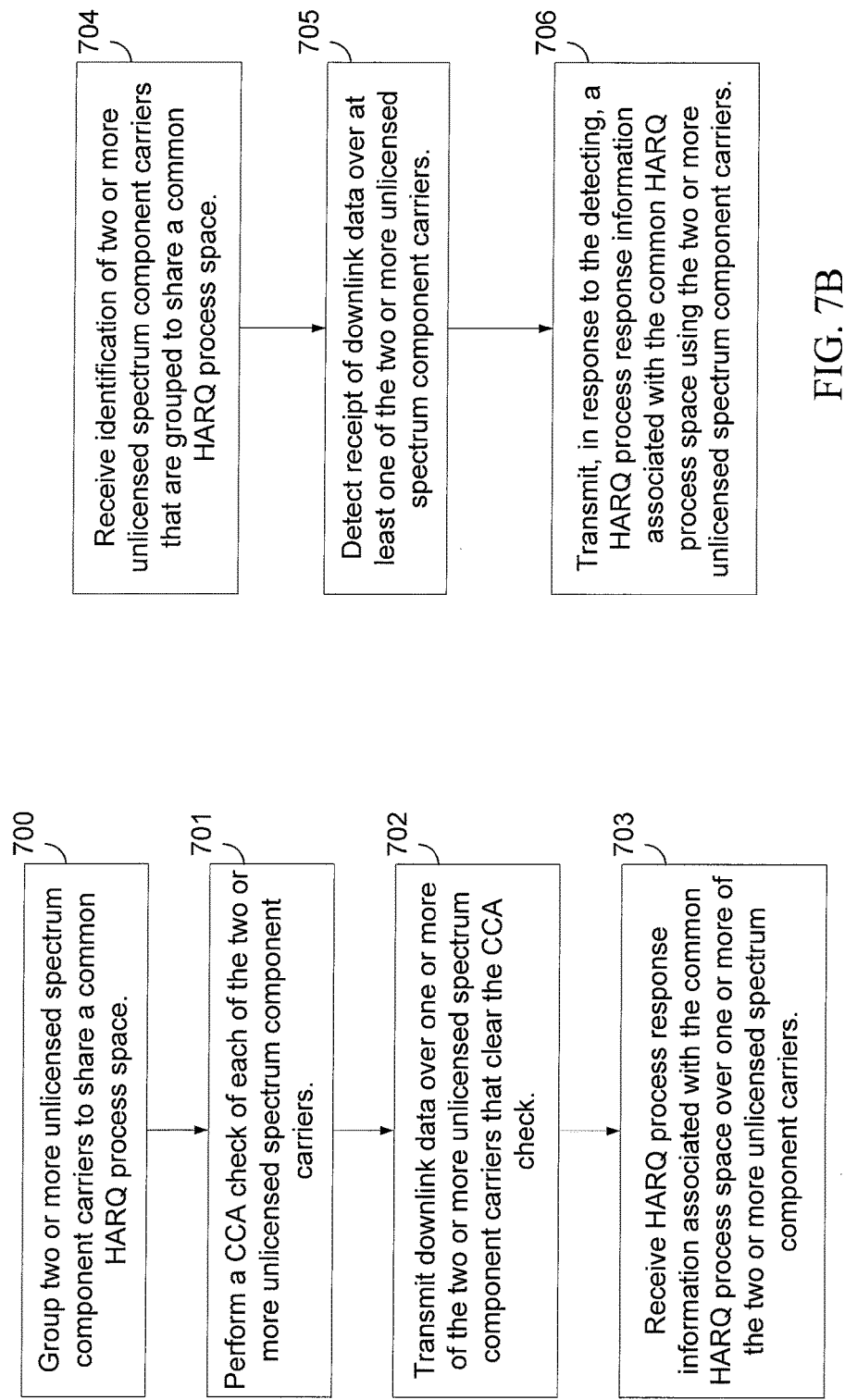
FIGS. 7A and 7B are functional block diagrams illustrating example blocks executed to implement one aspect of the present disclosure from a downlink transmission perspective.

FIGS. 7A and 7B are functional block diagrams illustrating example blocks executed to implement one aspect of the present disclosure. At block 700, a base station configured for communication using at least two component carriers in an unlicensed spectrum groups two or more unlicensed spectrum component carriers to share a common HARQ process space. The two or more unlicensed spectrum component carriers may be only a portion of all of the component carrier assigned for communication with the base station. Some of the other component carriers, in some aspects, may include component carriers in a licensed spectrum.

At block 701, the base station performs a CCA check of each of the two or more grouped unlicensed spectrum component carriers. At block 702, the base station transmits downlink data over one or more of the grouped unlicensed spectrum component carriers that cleared the CCA check. For the component carriers that did not clear the CCA check, transmission is suspended for at least 10 ms. On the UE side of the downlink communication, the UE receives identification of the two or more unlicensed spectrum component carriers that have been grouped to share the same, common HARQ process space. Thus, the base station then transmits downlink data over the CCA-clear unlicensed component carriers at block 702, the UE, at block 705, detects receipt of the downlink data over the identified group of unlicensed spectrum component carriers.

At block 706, the UE transmits HARQ process response information associated with the common HARQ process space, in response to whether or not it detects the data over the identified unlicensed spectrum component carriers, to the base station using the same identified unlicensed spectrum component carriers that share the common HARQ process space. This response by the UE may include a re-transmission of the previous uplink data or a new transmission of new uplink data, or it may also include ACK/NACK or channel quality information. At block 703, the base station receives the HARQ process response information using the one or more of the two or more unlicensed spectrum component carriers that share the common HARQ process space. The base station may then provide a response to this HARQ process response information depending on whether it is an ACK or a NACK.

FIGS. 8A and 8B are functional block diagrams illustrating example blocks executed to implement one aspect of the present disclosure. At block 800, a UE configured for performing communication in an LTE/LTE-A deployment with unlicensed spectrum using at least two component carriers in an unlicensed spectrum, receives identification of two or more unlicensed spectrum component carriers that have been grouped by the serving base station to share a common HARQ process space. The LTE/LTE-A deployment with unlicensed spectrum may also include component carriers that operate in a licensed spectrum, such that some of the assigned component carriers are licensed and others are unlicensed, such as in a SDL or CA mode deployment, or may only include unlicensed component carriers, such as in a SA mode deployment. The identification received by the UE at block 800, originates from the grouping of the unlicensed spectrum component carriers made by the serving base station at block 804.

At block 801, the UE performs a CCA check for each of the two or more unlicensed spectrum component carriers for transmission of uplink information. At block 802, the UE transmits uplink data over one or more of the two or more unlicensed spectrum component carriers that cleared the CCA check. At the base station side of this uplink communication, at block 805, the base station detects receipt of uplink data over any of the two or more unlicensed spectrum component carriers that the uplink data was sent on by the UE. At block 806, the base station will transmit HARQ process response information associated with the common HARQ process space depending on whether or not the base station successfully detects receipt of the uplink data. The base station transmits this HARQ process response information using the same ones of the two or more unlicensed spectrum component carriers that share the common HARQ process space if they successfully pass a CCA check. At block 803, the UE receives the HARQ process response information from the base station using the two or more unlicensed spectrum component carriers that share the common HARQ process space. The UE may then respond accordingly to the HARQ process response information by either re-transmitting the uplink data that was not received or by transmitting the next set of uplink data after the base station successfully received the previous transmission.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 7A, 7B, 8A, and 8B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   grouping, by a base station, two or more unlicensed spectrum component carriers of a plurality of component carriers assigned for communication by the base station to share a common hybrid automatic repeat request (HARQ) process space, such that same re-transmission data is attempted for transmission on each of at least two of the two or more unlicensed component carriers in response to receipt of a same HARQ process response;

performing, by the base station, a clear channel access (CCA) check of each of the two or more unlicensed spectrum component carriers;
transmitting, by the base station, downlink data over one or more of the two or more unlicensed spectrum component carriers that clear the CCA check;
receiving, by the base station, in response to the transmitting, HARQ process response information associated with the common HARQ process space; and
using an explicit HARQ indicator associated with a common HARQ process to notify a user equipment (UE) to expect the same re-transmission data on more than one of the at least two of the two or more unlicensed component carriers.

2. The method of claim 1, wherein the HARQ process response information is received over the one or more of the two or more unlicensed spectrum component carriers that the downlink data was transmitted.

3. The method of claim 1, further including:
generating, by the base station, a response to the HARQ process response information; and
transmitting, by the base station, the response using the two or more unlicensed spectrum component carriers.

4. The method of claim 3, wherein the response includes one of: a re-transmission of the downlink data or a new transmission of new downlink data.

5. The method of claim 3, wherein the transmitting includes:
performing, by the base station, a subsequent CCA check of each of the two or more unlicensed spectrum component carriers; and
transmitting, by the base station, the response using each of the two or more unlicensed spectrum component carriers that clear the subsequent CCA check.

6. The method of claim 1, further including:
transmitting, by the base station, to one or more user equipments (UEs) served by the base station a HARQ process configuration, wherein the HARQ process configuration includes at least an identification of the two or more unlicensed spectrum component carriers and a priority sequence for the one or more UEs to access the two or more unlicensed spectrum component carriers to receive the downlink data.

7. The method of claim 1, further including:
dividing a total HARQ process space into a private HARQ process space for each of the plurality of component carriers and the common HARQ process space shared by the two or more unlicensed spectrum component carriers.

8. The method of claim 7, wherein the common HARQ process space includes a plurality of common HARQ process spaces, and wherein each of the plurality of component carriers are assigned to one or more of the plurality of common HARQ process spaces.

9. A method of wireless communication, comprising:
receiving, at a user equipment (UE) from a serving base station, identification of two or more unlicensed spectrum component carriers of a plurality of component carriers assigned for communication with the serving base station that are grouped to share a common hybrid automatic repeat request (HARQ) process space, such that same re-transmission data is attempted for transmission on each of at least two of the two or more unlicensed component carriers in response to receipt of a same HARQ process response;
detecting, by the UE, receipt of downlink data over at least one of the two or more unlicensed spectrum component carriers of the identification;
transmitting, by the UE to the serving base station, in response to the detecting, HARQ process response information associated with the common HARQ process space using at least one of the two or more unlicensed spectrum component carriers; and
receiving, by the UE from the serving base station, an explicit HARQ indicator associated with a common HARQ process to notify the UE to expect the same re-transmission data on more than one of the at least two of the two or more unlicensed component carriers.

10. The method of claim 9, wherein the HARQ process response information includes one of: an acknowledgement for receipt of the downlink data or a negative acknowledgement for failed receipt of the downlink data.

11. The method of claim 9, wherein the transmitting includes:
performing, by the UE, a clear channel access (CCA) check of each of the two or more unlicensed spectrum component carriers;
transmitting, by the UE, the HARQ process response information over each of the two or more unlicensed spectrum component carriers that clear the CCA check.

12. The method of claim 9, further including:
receiving, at the UE from the serving base station, a priority sequence for the UE to access the two or more unlicensed spectrum component carriers to detect receipt of the downlink data, wherein the detecting receipt includes accessing the at least one of the two or more unlicensed spectrum component carriers according to the priority sequence to detect the downlink data.

13. The method of claim 9, further including:
identifying the downlink data by soft combining data received over the two or more unlicensed spectrum component carriers during the detecting.

14. A method of wireless communication, comprising:
receiving, at a user equipment (UE) from a serving base station, identification of two or more unlicensed spectrum component carriers of a plurality of component carriers assigned for communication with the serving base station that are grouped to share a common hybrid automatic repeat request (HARQ) process space, such that same re-transmission data is attempted for transmission on each of at least two of the two or more unlicensed component carriers in response to receipt of a same HARQ process response;
performing, by the UE, a clear channel access (CCA) check of each of the two or more unlicensed spectrum component carriers;
transmitting, by the UE, uplink data over one or more of the two or more unlicensed spectrum component carriers that clear the CCA check;
receiving, by the U E, in response to the transmitting, HARQ process response information associated with the common HARQ process space;
generating, by the UE, a response to the HARQ process response information; and
transmitting, by the UE to the serving base station, the response using each of the two or more unlicensed spectrum component carriers.

15. The method of claim 14, wherein the HARQ process response information is received over the one or more of the two or more unlicensed spectrum component carriers that the uplink data was transmitted.

16. The method of claim 14, wherein the response includes one of: a re-transmission of the uplink data or a new transmission of new uplink data.

17. The method of claim 14, wherein the response includes acknowledgement information and channel quality information.

18. The method of claim 14, wherein the transmitting the response includes:
performing, by the UE, a subsequent CCA check of each of the two or more unlicensed spectrum component carriers; and
transmitting, by the UE, the response using each of the two or more unlicensed spectrum component carriers that clear the subsequent CCA check.

19. A method of wireless communication, comprising:
grouping, by a base station, two or more unlicensed spectrum component carriers of a plurality of component carriers assigned for communication by the base station to share a common hybrid automatic repeat request (HARQ) process space, such that same re-transmission data is attempted for transmission on each of at least two of the two or more unlicensed component carriers in response to receipt of a same HARQ process response;
detecting, by the base station, receipt of uplink data from a user equipment (UE) over at least one of the two or more unlicensed spectrum component carriers; and
transmitting, by the base station to the UE, in response to the detecting, HARQ process response information associated with the common HARQ process space, wherein the HARQ process response information is transmitted using each of the two or more unlicensed spectrum component carriers on which the uplink data receipt is detected.

20. The method of claim 19, wherein the HARQ process response information includes one of: an acknowledgement for receipt of the uplink data or a negative acknowledgement for failed receipt of the uplink data.

21. The method of claim 19, wherein the transmitting the HARQ process response information includes:
performing, by the base station, a clear channel access (CCA) check of each of the two or more unlicensed spectrum component carriers;
transmitting, by the base station, the HARQ process response information over each of the two or more unlicensed spectrum component carriers that clear the CCA check.

22. The method of claim 19, further including:
identifying the uplink data by soft combining data received over the two or more unlicensed spectrum component carriers during the detecting.

23. An apparatus configured for wireless communication, comprising:
means for grouping, by a base station, two or more unlicensed spectrum component carriers of a plurality of component carriers assigned for communication by the base station to share a common hybrid automatic repeat request (HARQ) process space, such that same re-transmission data is attempted for transmission on each of at least two of the two or more unlicensed component carriers in response to receipt of a same HARQ process response;
means for performing, by the base station, a clear channel access (CCA) check of each of the two or more unlicensed spectrum component carriers;
means for transmitting, by the base station, downlink data over one or more of the two or more unlicensed spectrum component carriers that clear the CCA check;
means for receiving, by the base station, in response to the means for transmitting, HARQ process response information associated with the common HARQ process space; and
means for using an explicit HARQ indicator associated with a common HARQ process to notify a user equipment (UE) to expect the same re-transmission data on more than one of the at least two of the two or more unlicensed component carriers.

24. The apparatus of claim 23, wherein the HARQ process response information is received over the one or more of the two or more unlicensed spectrum component carriers that the downlink data was transmitted.

25. The apparatus of claim 23, further including:
means for generating, by the base station, a response to the HARQ process response information; and
means for transmitting, by the base station, the response using the two or more unlicensed spectrum component carriers.

26. The apparatus of claim 25, wherein the response includes one of: a re-transmission of the downlink data or a new transmission of new downlink data.

27. The apparatus of claim 25, wherein the means for transmitting the response includes:
means for performing, by the base station, a subsequent CCA check of each of the two or more unlicensed spectrum component carriers; and
means for transmitting, by the base station, the response using each of the two or more unlicensed spectrum component carriers that clear the subsequent CCA check.

28. The apparatus of claim 23 further including:
means for transmitting, by the base station, to one or more user equipments (UEs) served by the base station a HARQ process configuration, wherein the HARQ process configuration includes at least an identification of the two or more unlicensed spectrum component carriers and a priority sequence for the one or more UEs to access the two or more unlicensed spectrum component carriers to receive the downlink data.

29. The apparatus of claim 23, further including:
means for dividing a total HARQ process space into a private HARQ process space for each of the plurality of component carriers and the common HARQ process space shared by the two or more unlicensed spectrum component carriers.

30. The apparatus of claim 29, wherein the common HARQ process space includes a plurality of common HARQ process spaces, and wherein each of the plurality of component carriers are assigned to one or more of the plurality of common HARQ process spaces.

31. An apparatus configured for wireless communication, comprising:
means for receiving, at a user equipment (UE) from a serving base station, identification of two or more unlicensed spectrum component carriers of a plurality of component carriers assigned for communication with the serving base station that are grouped to share a common hybrid automatic repeat request (HARQ) process space, such that same re-transmission data is attempted for transmission on each of at least two of the two or more unlicensed component carriers in response to receipt of a same HARQ process response;

means for detecting, by the UE, receipt of downlink data over at least one of the two or more unlicensed spectrum component carriers of the identification;

means for transmitting, by the UE to the serving base station, in response to the means for detecting, HARQ process response information associated with the common HARQ process space using at least one of the two or more unlicensed spectrum component carriers; and means for receiving, by the UE from the serving base station, an explicit HARQ indicator associated with a common HARQ process to notify the UE to expect the same re-transmission data on more than one of the at least two of the two or more unlicensed component carriers.

32. The apparatus of claim 31, wherein the HARQ process response information includes one of: an acknowledgement for receipt of the downlink data or a negative acknowledgement for failed receipt of the downlink data.

33. The apparatus of claim 31, wherein the means for transmitting includes:
means for performing, by the UE, a clear channel access (CCA) check of each of the two or more unlicensed spectrum component carriers; and
means for transmitting, by the UE, the HARQ process response information over each of the two or more unlicensed spectrum component carriers that clear the CCA check.

34. The apparatus of claim 31, further including:
means for receiving, at the UE from the serving base station, a priority sequence for the UE to access the two or more unlicensed spectrum component carriers to detect receipt of the downlink data, wherein the means for detecting receipt includes means for accessing the at least one of the two or more unlicensed spectrum component carriers according to the priority sequence to detect the downlink data.

35. The apparatus of claim 31, further including:
means for identifying the downlink data by soft combining data received over the two or more unlicensed spectrum component carriers during execution of the means for detecting.

36. An apparatus configured for wireless communication, comprising:
means for receiving, at a user equipment (UE) from a serving base station, identification of two or more unlicensed spectrum component carriers of a plurality of component carriers assigned for communication with the serving base station that are grouped to share a common hybrid automatic repeat request (HARQ) process space, such that same re-transmission data is attempted for transmission on each of at least two of the two or more unlicensed component carriers in response to receipt of a same HARQ process response;
means for performing, by the UE, a clear channel access (CCA) check of each of the two or more unlicensed spectrum component carriers;
means for transmitting, by the UE, uplink data over one or more of the two or more unlicensed spectrum component carriers that clear the CCA check;
means for receiving, by the UE, in response to the means for transmitting, HARQ process response information associated with the common HARQ process space;
means for generating, by the UE, a response to the HARQ process response information; and
means for transmitting, by the UE to the serving base station, the response using each of the two or more unlicensed spectrum component carriers.

37. The apparatus of claim 36, wherein the HARQ process response information is received over the one or more of the two or more unlicensed spectrum component carriers that the uplink data was transmitted.

38. The apparatus of claim 36, wherein the response includes one of: a re-transmission of the uplink data or a new transmission of new uplink data.

39. The apparatus of claim 36, wherein the response includes acknowledgement information and channel quality information.

40. The apparatus of claim 36, wherein the means for transmitting the response includes:
means for performing, by the UE, a subsequent CCA check of each of the two or more unlicensed spectrum component carriers; and
means for transmitting, by the UE, the response using each of the two or more unlicensed spectrum component carriers that clear the subsequent CCA check.

41. An apparatus configured for wireless communication, comprising:
means for grouping, by a base station, two or more unlicensed spectrum component carriers of a plurality of component carriers assigned for communication by the base station to share a common hybrid automatic repeat request (HARQ) process space, such that same re-transmission data is attempted for transmission on each of at least two of the two or more unlicensed component carriers;
means for detecting, by the base station, receipt of uplink data from a user equipment (UE) over at least one of the two or more unlicensed spectrum component carriers; and
means for transmitting, by the base station to the UE, in response to the means for detecting, HARQ process response information associated with the common HARQ process space, wherein the HARQ process response information is transmitted using each of the two or more unlicensed spectrum component carriers on which the uplink data receipt is detected in response to receipt of a same HARQ process response.

42. The apparatus of claim 41, wherein the HARQ process response information includes one of: an acknowledgement for receipt of the uplink data or a negative acknowledgement for failed receipt of the uplink data.

43. The apparatus of claim 41, wherein the means for transmitting the HARQ process response information includes:
means for performing, by the base station, a clear channel access (CCA) check of each of the two or more unlicensed spectrum component carriers; and
means for transmitting, by the base station, the HARQ process response information over each of the two or more unlicensed spectrum component carriers that clear the CCA check.

44. The apparatus of claim 41, further including:
means for identifying the uplink data by soft combining data received over the two or more unlicensed spectrum component carriers during execution of the means for detecting.

45. A non-transitory computer-readable medium having program code recorded thereon, comprising:
program code for causing a computer to group, by a base station, two or more unlicensed spectrum component carriers of a plurality of component carriers assigned for communication by the base station to share a common hybrid automatic repeat request (HARQ) process space, such that same re-transmission data is attempted for transmission on each of at least two of the two or more unlicensed component carriers in response to receipt of a same HARQ process response;

program code for causing the computer to perform, by the base station, a clear channel access (CCA) check of each of the two or more unlicensed spectrum component carriers;

program code for causing the computer to transmit, by the base station, downlink data over one or more of the two or more unlicensed spectrum component carriers that clear the CCA check;

program code for causing the computer to receive, by the base station, in response to execution of the program code for causing the computer to transmit, HARQ process response information associated with the common HARQ process space; and program code for causing the computer to use an explicit HARQ indicator associated with a common HARQ process to notify a user equipment (UE) to expect the same re-transmission data on more than one of the at least two of the two or more unlicensed component carriers.

46. The non-transitory computer-readable medium of claim 45, wherein the HARQ process response information is received over the one or more of the two or more unlicensed spectrum component carriers that the downlink data was transmitted.

47. The non-transitory computer-readable medium of claim 45, further including program code for causing the computer to:
generate, by the base station, a response to the HARQ process response information; and
transmit, by the base station, the response using the two or more unlicensed spectrum component carriers.

48. The non-transitory computer-readable medium of claim 47, wherein the response includes one of: a re-transmission of the downlink data or a new transmission of new downlink data.

49. The non-transitory computer-readable medium of claim 47, wherein the program code for causing the computer to transmit includes program code for causing the computer to:
perform, by the base station, a subsequent CCA check of each of the two or more unlicensed spectrum component carriers; and
transmit, by the base station, the response using each of the two or more unlicensed spectrum component carriers that clear the subsequent CCA check.

50. The non-transitory computer-readable medium of claim 45, further including program code for causing the computer to:
transmit, by the base station, to one or more user equipments (UEs) served by the base station a HARQ process configuration, wherein the HARQ process configuration includes at least an identification of the two or more unlicensed spectrum component carriers and a priority sequence for the one or more UEs to access the two or more unlicensed spectrum component carriers to receive the downlink data.

51. The non-transitory computer-readable medium of claim 45, further including program code for causing the computer to:
divide a total HARQ process space into a private HARQ process space for each of the plurality of component carriers and the common HARQ process space shared by the two or more unlicensed spectrum component carriers.

52. The non-transitory computer-readable medium of claim 51, wherein the common HARQ process space includes a plurality of common HARQ process spaces, and wherein each of the plurality of component carriers are assigned to one or more of the plurality of common HARQ process spaces.

53. A non-transitory computer-readable medium having program code recorded thereon, comprising:
program code for causing a computer to receive, at a user equipment (UE) from a serving base station, identification of two or more unlicensed spectrum component carriers of a plurality of component carriers assigned for communication with the serving base station that are grouped to share a common hybrid automatic repeat request (HARQ) process space, such that same re-transmission data is attempted for transmission on each of at least two of the two or more unlicensed component carriers in response to receipt of a same HARQ process response;

program code for causing the computer to detect, by the UE, receipt of downlink data over at least one of the two or more unlicensed spectrum component carriers of the identification;

program code for causing the computer to transmit, by the UE to the serving base station, in response to execution of the program code for causing the computer to detect, HARQ process response information associated with the common HARQ process space using at least one of the two or more unlicensed spectrum component carriers; and program code for causing the computer to receive, by the UE from the serving base station, an explicit HARQ indicator associated with a common HARQ process to notify the UE to expect the same re-transmission data on more than one of the at least two of the two or more unlicensed component carriers.

54. The non-transitory computer-readable medium of claim 53, wherein the HARQ process response information includes one of: an acknowledgement for receipt of the downlink data or a negative acknowledgement for failed receipt of the downlink data.

55. The non-transitory computer-readable medium of claim 53, wherein the program code for causing the computer to transmit includes program code for causing the computer to:
perform, by the UE, a clear channel access (CCA) check of each of the two or more unlicensed spectrum component carriers;
transmit, by the UE, the HARQ process response information over each of the two or more unlicensed spectrum component carriers that clear the CCA check.

56. The non-transitory computer-readable medium of claim 53, further including program code for causing the computer to:
receive, at the UE from the serving base station, a priority sequence for the UE to access the two or more unlicensed spectrum component carriers to detect receipt of the downlink data, wherein the program code for causing the computer to detect receipt includes program code for causing the computer to access the at least one of the two or more unlicensed spectrum component carriers according to the priority sequence to detect the downlink data.

57. The non-transitory computer-readable medium of claim 53, further including program code for causing the computer to:

identify the downlink data by soft combining data received over the two or more unlicensed spectrum component carriers during execution of the program code for causing the computer to detect.

58. A non-transitory computer-readable medium having program code recorded thereon, comprising:
   program code for causing a computer to receive, at a user equipment (UE) from a serving base station, identification of two or more unlicensed spectrum component carriers of a plurality of component carriers assigned for communication with the serving base station that are grouped to share a common hybrid automatic repeat request (HARQ) process space, such that same re-transmission data is attempted for transmission on each of at least two of the two or more unlicensed component carriers in response to receipt of a same HARQ process response;
   program code for causing the computer to perform, by the UE, a clear channel access (CCA) check of each of the two or more unlicensed spectrum component carriers;
   program code for causing the computer to transmit, by the UE, uplink data over one or more of the two or more unlicensed spectrum component carriers that clear the CCA check;
   program code for causing the computer to receive, by the UE, in response to execution of the program code for causing the computer to transmit, HARQ process response information associated with the common HARQ process space;
   generate, by the UE, a response to the HARQ process response information; and
   transmit, by the UE to the serving base station, the response using each of the two or more unlicensed spectrum component carriers.

59. The non-transitory computer-readable medium of claim 58, wherein the HARQ process response information is received over the one or more of the two or more unlicensed spectrum component carriers that the uplink data was transmitted.

60. The non-transitory computer-readable medium of claim 58, wherein the response includes one of: a re-transmission of the uplink data or a new transmission of new uplink data.

61. The non-transitory computer-readable medium of claim 58, wherein the response includes acknowledgement information and channel quality information.

62. The non-transitory computer-readable medium of claim 58, wherein the program code for causing the computer to transmit the response includes program code for causing the computer to:
   perform, by the UE, a subsequent CCA check of each of the two or more unlicensed spectrum component carriers; and
   transmit, by the UE, the response using each of the two or more unlicensed spectrum component carriers that clear the subsequent CCA check.

63. A non-transitory computer-readable medium having program code recorded thereon, comprising:
   program code for causing a computer to group, by a base station, two or more unlicensed spectrum component carriers of a plurality of component carriers assigned for communication by the base station to share a common hybrid automatic repeat request (HARQ) process space, such that same re-transmission data is attempted for transmission on each of at least two of the two or more unlicensed component carriers in response to receipt of a same HARQ process response;
   program code for causing the computer to detect, by the base station, receipt of uplink data from a user equipment (UE) over at least one of the two or more unlicensed spectrum component carriers; and
   program code for causing the computer to transmit, by the base station to the UE, in response to execution of the program code for causing the computer to detect, HARQ process response information associated with the common HARQ process space, wherein the HARQ process response information is transmitted using each of the two or more unlicensed spectrum component carriers on which the uplink data receipt is detected.

64. The non-transitory computer-readable medium of claim 63, wherein the HARQ process response information includes one of: an acknowledgement for receipt of the uplink data or a negative acknowledgement for failed receipt of the uplink data.

65. The non-transitory computer-readable medium of claim 63, wherein the program code for causing the computer to transmit the HARQ process response information includes program code for causing the computer to:
   perform, by the base station, a clear channel access (CCA) check of each of the two or more unlicensed spectrum component carriers; and
   transmit, by the base station, the HARQ process response information over each of the two or more unlicensed spectrum component carriers that clear the CCA check.

66. The non-transitory computer-readable medium of claim 63, further including program code for causing the computer to:
   identify the uplink data by soft combining data received over the two or more unlicensed spectrum component carriers during the detecting.

67. An apparatus configured for wireless communication, the apparatus comprising:
   at least one processor; and
   a memory coupled to the at least one processor,
   wherein the at least one processor is configured:
      to group, by a base station, two or more unlicensed spectrum component carriers of a plurality of component carriers assigned for communication by the base station to share a common hybrid automatic repeat request (HARQ) process space, such that same re-transmission data is attempted for transmission on each of at least two of the two or more unlicensed component carriers in response to receipt of a same HARQ process response;
      to perform, by the base station, a clear channel access (CCA) check of each of the two or more unlicensed spectrum component carriers;
      to transmit, by the base station, downlink data over one or more of the two or more unlicensed spectrum component carriers that clear the CCA check;
      to receive, by the base station, in response to execution of the configuration of the at least one processor to transmit, HARQ process response information associated with the common HARQ process space; and
      to use an explicit HARQ indicator associated with a common HARQ process to notify a user equipment (UE) to expect the same re-transmission data on more than one of the at least two of the two or more unlicensed component carriers.

68. The apparatus of claim 67, wherein the HARQ process response information is received over the one or more of the two or more unlicensed spectrum component carriers that the downlink data was transmitted.

69. The apparatus of claim 67, further including configuration of the at least one processor to:
  generate, by the base station, a response to the HARQ process response information; and
  transmit, by the base station, the response using the two or more unlicensed spectrum component carriers.

70. The apparatus of claim 69, wherein the response includes one of: a re-transmission of the downlink data or a new transmission of new downlink data.

71. The apparatus of claim 69, wherein the configuration of the at least one processor to transmit includes configuration of the at least one processor to:
  perform, by the base station, a subsequent CCA check of each of the two or more unlicensed spectrum component carriers; and
  transmit, by the base station, the response using each of the two or more unlicensed spectrum component carriers that clear the subsequent CCA check.

72. The apparatus of claim 67, further including configuration of the at least one processor to:
  transmit, by the base station, to one or more user equipments (UEs) served by the base station a HARQ process configuration, wherein the HARQ process configuration includes at least an identification of the two or more unlicensed spectrum component carriers and a priority sequence for the one or more UEs to access the two or more unlicensed spectrum component carriers to receive the downlink data.

73. The apparatus of claim 67, further including configuration of the at least one processor to:
  divide a total HARQ process space into a private HARQ process space for each of the plurality of component carriers and the common HARQ process space shared by the two or more unlicensed spectrum component carriers.

74. The apparatus of claim 73, wherein the common HARQ process space includes a plurality of common HARQ process spaces, and wherein each of the plurality of component carriers are assigned to one or more of the plurality of common HARQ process spaces.

75. An apparatus configured for wireless communication, the apparatus comprising:
  at least one processor; and
  a memory coupled to the at least one processor,
  wherein the at least one processor is configured:
    to receive, at a user equipment (UE) from a serving base station, identification of two or more unlicensed spectrum component carriers of a plurality of component carriers assigned for communication with the serving base station that are grouped to share a common hybrid automatic repeat request (HARQ) process space, such that same re-transmission data is attempted for transmission on each of at least two of the two or more unlicensed component carriers in response to receipt of a same HARQ process response;
    to detect, by the UE, receipt of downlink data over at least one of the two or more unlicensed spectrum component carriers of the identification; and
    to transmit, by the UE to the serving base station, in response to execution of the configuration of the at least one processor to detect, HARQ process response information associated with the common HARQ process space using at least one of the two or more unlicensed spectrum component carriers; and
    to receive, by the UE from the serving base station, an explicit HARQ indicator associated with a common HARQ process to notify the UE to expect the same re-transmission data on more than one of the at least two of the two or more unlicensed component carriers.

76. The apparatus of claim 75, wherein the HARQ process response information includes one of: an acknowledgement for receipt of the downlink data or a negative acknowledgement for failed receipt of the downlink data.

77. The apparatus of claim 75, wherein the configuration of the at least one processor to transmit includes configuration of the at least one processor to:
  perform, by the UE, a clear channel access (CCA) check of each of the two or more unlicensed spectrum component carriers; and
  transmit, by the UE, the HARQ process response information over each of the two or more unlicensed spectrum component carriers that clear the CCA check.

78. The apparatus of claim 75, further including configuration of the at least one processor to:
  receive, at the UE from the serving base station, a priority sequence for the UE to access the two or more unlicensed spectrum component carriers to detect receipt of the downlink data, wherein the configuration of the at least one processor to detect receipt includes configuration of the at least one processor to access the at least one of the two or more unlicensed spectrum component carriers according to the priority sequence to detect the downlink data.

79. The apparatus of claim 75, further including configuration of the at least one processor to:
  identify the downlink data by soft combining data received over the two or more unlicensed spectrum component carriers during execution of the configuration of the at least one processor to detect.

80. An apparatus configured for wireless communication, the apparatus comprising:
  at least one processor; and
  a memory coupled to the at least one processor,
  wherein the at least one processor is configured:
    to receiving, at a user equipment (UE) from a serving base station, identification of two or more unlicensed spectrum component carriers of a plurality of component carriers assigned for communication with the serving base station that are grouped to share a common hybrid automatic repeat request (HARQ) process space, such that same re-transmission data is attempted for transmission on each of at least two of the two or more unlicensed component carriers in response to receipt of a same HARQ process response;
    to perform, by the UE, a clear channel access (CCA) check of each of the two or more unlicensed spectrum component carriers;
    to transmit, by the UE, uplink data over one or more of the two or more unlicensed spectrum component carriers that clear the CCA check;
    to receive, by the UE, in response to execution of the configuration of the at least one processor to transmit, HARQ process response information associated with the common HARQ process space;
    generate, by the UE, a response to the HARQ process response information; and
    transmit, by the UE to the serving base station, the response using the two or more unlicensed spectrum component carriers.

81. The apparatus of claim 80, wherein the HARQ process response information is received over the one or more of the two or more unlicensed spectrum component carriers that the uplink data was transmitted.

82. The apparatus of claim 80, wherein the response includes one of: a re-transmission of the uplink data or a new transmission of new uplink data.

83. The apparatus of claim 80, wherein the response includes acknowledgement information and channel quality information.

84. The apparatus of claim 80, wherein the configuration of the at least one processor to transmit the response includes configuration of the at least one processor to:
   perform, by the UE, a subsequent CCA check of each of the two or more unlicensed spectrum component carriers; and
   transmit, by the UE, the response using each of the two or more unlicensed spectrum component carriers that clear the subsequent CCA check.

85. An apparatus configured for wireless communication, the apparatus comprising:
   at least one processor; and
   a memory coupled to the at least one processor,
   wherein the at least one processor is configured:
      to group, by a base station, two or more unlicensed spectrum component carriers of a plurality of component carriers assigned for communication by the base station to share a common hybrid automatic repeat request (HARQ) process space, such that same re-transmission data is attempted for transmission on each of at least two of the two or more unlicensed component carriers in response to receipt of a same HARQ process response;
      to detect, by the base station, receipt of uplink data from a user equipment (UE) over at least one of the two or more unlicensed spectrum component carriers; and
      to transmit, by the base station to the UE, in response to execution of the configuration of the at least one processor to detect, HARQ process response information associated with the common HARQ process space, wherein the HARQ process response information is transmitted using each of the two or more unlicensed spectrum component carriers on which the uplink data receipt is detected.

86. The apparatus of claim 85, wherein the HARQ process response information includes one of: an acknowledgement for receipt of the uplink data or a negative acknowledgement for failed receipt of the uplink data.

87. The apparatus of claim 85, wherein the configuration of the at least one processor to transmit the HARQ process response information includes configuration of the at least one processor to:
   perform, by the base station, a clear channel access (CCA) check of each of the two or more unlicensed spectrum component carriers; and
   transmit, by the base station, the HARQ process response information over each of the two or more unlicensed spectrum component carriers that clear the CCA check.

88. The apparatus of claim 85, further including configuration of the at least one processor to:
   identify the uplink data by soft combining data received over the two or more unlicensed spectrum component carriers during the detecting.

* * * * *